US012125464B2

(12) United States Patent
Gerdes et al.

(10) Patent No.: US 12,125,464 B2
(45) Date of Patent: Oct. 22, 2024

(54) ASSEMBLY INCLUDING ACOUSTIC BAFFLES

(71) Applicant: 3M INNOVATIVE PROPERTIES COMPANY, St. Paul, MN (US)

(72) Inventors: Ronald W. Gerdes, St. Paul, MN (US); Catherine A. Leatherdale, Woodbury, MN (US); Thomas Herdtle, Inver Grove Heights, MN (US); Paul A. Nielsen, LaGrange, GA (US); Timothy J. Rowell, St. Paul, MN (US); Liyun Ren, Woodbury, MN (US); Daniel J. Zillig, Woodbury, MN (US); Sachin Talwar, Woodbury, MN (US); Eumi Pyun, St. Paul, MN (US); Jeffrey A. Chambers, Minneapolis, MN (US); Pingfan Wu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 233 days.

(21) Appl. No.: 17/633,851

(22) PCT Filed: Aug. 28, 2020

(86) PCT No.: PCT/IB2020/058055
§ 371 (c)(1),
(2) Date: Feb. 8, 2022

(87) PCT Pub. No.: WO2021/044272
PCT Pub. Date: Mar. 11, 2021

(65) Prior Publication Data

US 2022/0366887 A1 Nov. 17, 2022

Related U.S. Application Data

(60) Provisional application No. 62/895,317, filed on Sep. 3, 2019.

(51) Int. Cl.
*F24F 13/24* (2006.01)
*G10K 11/16* (2006.01)
(Continued)

(52) U.S. Cl.
CPC .................................. *G10K 11/168* (2013.01)

(58) Field of Classification Search
CPC .... G10K 11/16; G10K 11/168; G10K 11/162; F24F 13/24; F24F 2013/242; G11B 33/08; G11B 33/142
See application file for complete search history.

(56) References Cited

U.S. PATENT DOCUMENTS 2,270,825 A * 1/1942 Parkinson ............ G10K 11/161 73/147
2,855,039 A * 10/1958 Gross .................... E04B 1/8209 181/287
(Continued)

FOREIGN PATENT DOCUMENTS

JP 60200041 10/1985
WO WO 2011-121450 10/2011
(Continued)

OTHER PUBLICATIONS

"Open Cloud Server—Project Olympus—JBOD", Presentation at Open Compute 2017, Bruce Hoch/Senior Mechanical Engineer/ Microsoft, 2017, pp. 1-19.
(Continued)

*Primary Examiner* — Edgardo San Martin
(74) *Attorney, Agent, or Firm* — Clifton F. Richardson

(57) ABSTRACT

An assembly includes an enclosure including first and second regions spaced apart along a first direction, and a plurality of spaced apart acoustic baffles arranged along a second direction different from the first direction and disposed in the enclosure between the first and second regions.
(Continued)

The plurality of spaced apart acoustic baffles includes adjacent first and second acoustic baffles. Each of the first and second acoustic baffles include an acoustically absorptive layer disposed on a sheet having a specific airflow resistance greater than 200 MKS Rayl. The first and second acoustic baffles define a channel therebetween. At least a portion of the channel extends along a longitudinal direction making an oblique angle with the first direction.

18 Claims, 18 Drawing Sheets

(51) Int. Cl.
*G10K 11/168* (2006.01)
*G11B 33/08* (2006.01)

(56) References Cited

U.S. PATENT DOCUMENTS 2,916,101 A * 12/1959 Naman ................ G10K 11/172 181/224
3,265,154 A * 8/1966 March ........................ E04B 1/86 181/290
3,779,341 A * 12/1973 Huggins ............... F04D 29/663 165/59
4,212,369 A * 7/1980 Zeilinger ............... B60K 11/08 181/258
4,276,954 A * 7/1981 Romano ................. F24F 13/24 181/291
4,330,047 A * 5/1982 Ruspa ..................... F24F 13/24 454/906
4,335,797 A * 6/1982 Simmons ............ B60R 13/0838 454/162
4,719,279 A 1/1988 Kauth
5,798,064 A 8/1998 Peterson
6,598,701 B1 7/2003 Wood
6,617,002 B2 9/2003 Wood
6,720,362 B1 4/2004 Park
6,861,499 B2 3/2005 Vinciguerra
6,977,109 B1 12/2005 Wood
7,358,282 B2 4/2008 Krueger
7,591,346 B2 9/2009 Thompson, Jr.
7,712,576 B2 * 5/2010 Goto ....................... G06F 1/182 181/205
7,757,811 B2 7/2010 Fox
8,091,682 B2 * 1/2012 Yamauchi .......... H05K 7/20172 181/224
8,387,747 B2 * 3/2013 Koike ..................... B32B 15/12 181/290
8,499,887 B2 * 8/2013 Gleine .................... B32B 5/024 181/292
8,701,821 B2 * 4/2014 O'Coimin .......... H05K 7/20736 181/224
8,727,071 B2 5/2014 Berker
8,802,002 B2 8/2014 Berrigan
9,194,065 B2 11/2015 Moore
9,238,203 B2 1/2016 Scheibner
9,603,395 B2 3/2017 Duffy
9,695,278 B2 7/2017 Kagumba
9,840,794 B2 12/2017 Seidel
10,260,772 B2 * 4/2019 Mouratidis .......... G10K 11/161
10,309,302 B2 * 6/2019 Wilhelm ................. F02B 77/13
10,453,436 B2 * 10/2019 Chen .................... G10K 11/175
10,458,589 B2 * 10/2019 Hill .......................... F24F 13/24
10,631,432 B2 * 4/2020 Gopalakrishna ... H05K 7/20181
10,668,701 B2 * 6/2020 Wu ......................... B32B 25/14
11,199,235 B2 * 12/2021 Alexander .......... B60R 13/0815
11,402,123 B2 * 8/2022 Lee ......................... F24F 13/02
2005/0126848 A1 * 6/2005 Siavoshai ........... B60R 13/0815 181/290
2006/0020064 A1 1/2006 Bauer
2008/0230305 A1 9/2008 Goto
2010/0307862 A1 12/2010 Yamauchi
2012/0121843 A1 5/2012 Lebel
2012/0279799 A1 * 11/2012 Graf ........................ B32B 15/20 181/290
2013/0153331 A1 6/2013 Schneider
2016/0298266 A1 10/2016 Zillig
2017/0160771 A1 6/2017 Albrecht
2017/0221526 A1 8/2017 Albrecht
2017/0276397 A1 * 9/2017 Mouratidis ............. F24F 13/08
2018/0090181 A1 3/2018 Paterra
2018/0330712 A1 11/2018 Chen
2019/0213990 A1 7/2019 Jonza
2020/0223171 A1 * 7/2020 Stecenko .................. B32B 7/02
2022/0093072 A1 * 3/2022 Ayres ................... G10K 11/172

FOREIGN PATENT DOCUMENTS

WO WO 2019-005858 1/2019
WO WO 2019-069202 4/2019
WO WO 2019-135150 7/2019
WO WO 2020-079588 4/2020

OTHER PUBLICATIONS

"Project Olympus DX-88 Disk Expansion Chassis", Open Compute, Project Olympus DX-88 Specification, 2017, pp. 1-32.
Dutta, "Performance of Hard Disk Drives in High Noise Environments", Michigan Technological University, 2017, pp. 1-78.
Reinsel, "The Digitization of the World From Edge to Core", Data Age 2025, IDC White Paper No. US44413318, Nov. 2018, pp. 1-28.
Segura-Alcaraz, "The Use of Fabrics to Improve the Acoustic Absorption: Influence of the Woven Fabric Thread Density Over a Nonwoven", AUTEX Research Journal, Sciendo, 2018, vol. 18, No. 03, pp. 269-280.
Shahrad, "Acoustic Denial of Service Attacks on HDDs", 2017, pp. 1-8.
International Search Report for PCT International Application No. PCT/IB2020/058055, mailed on Nov. 24, 2020, 3 pages.

* cited by examiner

ASSEMBLY INCLUDING ACOUSTIC BAFFLES

CROSS REFERENCE TO RELATED APPLICATIONS

This application is a national stage filing under 35 U.S.C. 371 of PCT/IB2020/058055, filed Aug. 28, 2020, which claims the benefit of Provisional Application No. 62/895,317, filed Sep. 3, 2019, the disclosures of which are incorporated by reference in their entirety herein.

BACKGROUND

Acoustic panels may be used to block or absorb sound.

SUMMARY

In some aspects of the present description, an acoustic baffle is provided. In some embodiments, the acoustic baffle includes at least one acoustically absorptive layer and may further include at least one acoustically reflective layer. In some embodiments, the acoustic baffle includes first and second acoustically absorptive layers and a microperforated panel disposed therebetween. In some embodiments, an array of the acoustic baffles is provided. An assembly, such as an electronics assembly, may include the array of acoustic baffles disposed in an enclosure. For example, the array of acoustic baffles may be disposed between a plurality of fans and a plurality of hard disk drives in a computer server enclosure.

In some aspects of the present description, an assembly is provided. The assembly includes an enclosure including first and second regions spaced apart along a first direction, and a plurality of spaced apart acoustic baffles arranged along a second direction different from the first direction and disposed in the enclosure between the first and second regions. In some embodiments, the plurality of spaced apart acoustic baffles includes adjacent first and second acoustic baffle where each of the first and second acoustic baffles includes a first acoustically absorptive layer disposed on a first sheet having a specific airflow resistance greater than 200 MKS Rayl. The first and second acoustic baffles define a channel therebetween. At least a portion of the channel extends along a longitudinal direction making an oblique angle with the first direction.

In some aspects of the present description, an assembly is provided. The assembly includes an enclosure including first and second regions spaced apart along a first direction, and a plurality of spaced apart acoustic baffles arranged along a second direction different from the first direction and disposed in the enclosure between the first and second regions. In some embodiments, the plurality of spaced apart acoustic baffles includes adjacent first and second acoustic baffles where each of the first and second acoustic baffles includes an acoustically absorptive layer disposed on an acoustically reflective layer. The acoustically reflective layer of the first acoustic baffle faces the acoustically absorptive layer of the second acoustic baffle such that at least a portion of sound propagating from the first region toward the second region reflects from the acoustically reflective layer of the first acoustic baffle and is absorbed by the acoustically absorptive layer of the second acoustic baffle.

In some aspects of the present description, an assembly is provided. The assembly includes an enclosure including first and second regions spaced apart along a first direction, and a plurality of spaced apart acoustic baffles arranged along a second direction different from the first direction and disposed in the enclosure between the first and second regions. In some embodiments, the plurality of spaced apart acoustic baffles includes at least one acoustic baffle including first and second acoustically absorptive layers and a microperforated panel disposed therebetween.

DETAILED DESCRIPTION

Figure 1:
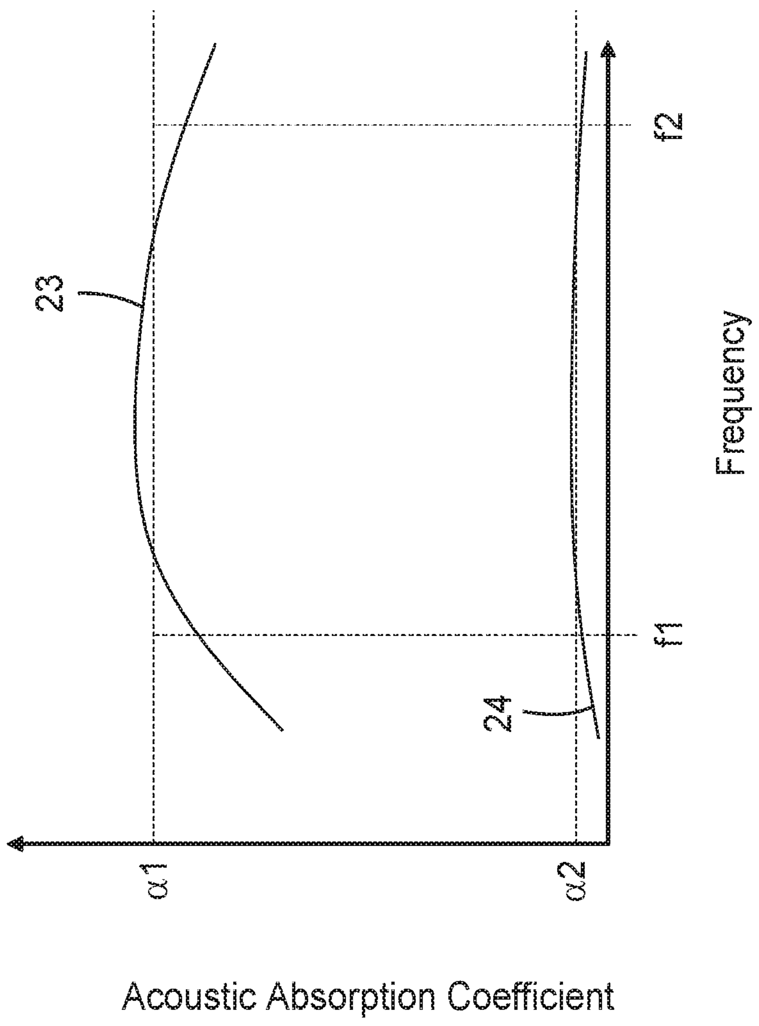
FIG. 1 is a schematic plot of acoustic absorption coefficients as a function of frequency.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments, an acoustic baffle includes at least two layers having different acoustic properties. For example, a first layer can be more acoustically absorptive than a second layer, and the second layer can be more acoustically reflective than the first layer. As another example, outer layers can absorb higher frequencies while a center layer can absorb lower frequencies and, in some cases, reflect the higher frequencies. It has been found that arrangements of the baffles provide an unexpected synergy from using layers with different acoustic properties, according to some embodiments. For example, a sound-absorbing nonwoven material often includes a scrim on at least one side of the nonwoven material where it has conventionally been held that the scrim should be open (e.g., have a low specific airflow resistance) so that sound can propagate through the scrim to reach the nonwoven material and be absorbed by the nonwoven material. However, it has been found that when the open scrim is replaced with an acoustically reflective layer that an arrangement of a plurality of the baffles can provide a higher acoustic transmission loss, for at least some frequencies, than when an open scrim is used even though sound incident on the reflective layer of a baffle is primarily reflected, rather than absorbed, by the baffle.

Acoustic baffles according to the present disclosure may exhibit sound absorption and/or sound reflection at relevant frequencies, rigidity, weight, thickness, air flow management, heat resistance, fire resistance, etc. The baffles may be used in any application, structure, or device than can benefit from the characteristics of the baffles. The baffles may be suitable for use with electronics, computers, and/or servers, for example.

An assembly can include acoustic baffles disposed in an enclosure. An enclosure may include a housing at least partially surrounding an interior of the enclosure. The housing may have open areas so that the housing does not fully surround the interior of the enclosure. An enclosure may include one or more openings to allow airflow through the enclosure. For example, in some embodiments, the enclosure may be a duct having open ends. An enclosure may be or include a housing or a case for an electronic device. For example, an enclosure may be a computer case. The assembly may be used, for example, in any application where sound is generated within the enclosure of the assembly or where sound is transmitted into the enclosure. Any of the assemblies described herein may be an electronics assembly. Any of the enclosures described herein may be an electronics enclosure. An electronics assembly includes, or is configured to receive (e.g., in an electronics enclosure), one or more electronic devices or components. For example, an electronics assembly may be a computer server assembly that includes one or more hard disk drives.

Server rooms, and in particular server rooms with multiple servers mounted on server racks can be noisy due to the operation of cooling fans. However, it has been found that hard disk drives are sensitive to high frequency sound. A recent study by T. Dutta (Master's Thesis, Michigan Technological University, December 2017) showed that the performance of hard disk drives from multiple manufacturers can be adversely affected by sound levels above 90 dB. Certain sound frequencies correspond to the modal frequencies of the platters of the hard disk drives. Such frequencies occur around 1100 Hz, 1800 Hz, 3100 Hz, 4600 Hz, 6350 Hz, and 7900 Hz. Loud sounds at or around these frequencies may negatively affect hard disk drive performance. The sound level above which performance begins to be adversely affected varies and may depend on the individual hard disk drive. Others have shown that selective excitation of the hard disk drives platter modal frequencies could result in hard disk drive failure and could be exploited for a denial of service attack, for example (see, e.g., M. Shahrad et al., *Acoustic Denial of Service Attacks on Hard Disk Drives,* 2018 Workshop on Attacks and Solutions in Hardware Security (ASHES 2018), Toronto, Canada). Systems used to cool computers or servers may create noise at or around the frequencies that may negatively impact hard disk drive performance. Other resonances or modes in addition to those experienced by the hard drive platter can also be problematic. For example, high frequency modes can exist on the disk drive suspension which, if excited, can also degrade disk drive performance.

In some embodiments, a computer server includes a plurality of the acoustic baffles disposed between fans and hard disk drives to prevent sound from the fans from adversely affecting the hard disk drives without substantially restraining airflow to the hard disk drives.

Useful quantities to characterize acoustic materials, such as the individual layers of an acoustic baffle or of the acoustic baffle itself, include specific airflow resistance, airflow resistivity, acoustic reflectance, acoustic transmittance, and acoustic absorbance.

The airflow resistance of a sample (e.g., a layer) is the quotient of air pressure difference access the sample divided by the volume velocity of airflow through the sample. Airflow resistance can be expressed in MKS acoustic ohms (Pa s/m$^3$). The specific airflow resistance of a sample is the product of the airflow resistance of the sample and its area. This can also be expressed as the air pressure difference across the sample divided by the linear velocity of airflow measured outside the sample. The specific airflow resistance can be expressed in MKS Rayl (Pa s/m). The airflow resistivity of a sample is its specific airflow resistance divided by its thickness. The airflow resistivity can be expressed in MKS Rayl/m (Pa s/m$^2$). The airflow resistance, specific airflow resistance, and the airflow resistivity can be determined at a linear airflow velocity of 0.5 mm/s. The airflow resistance, specific airflow resistance, and the airflow resistivity can be determined according to the ASTM C522-03 test standard, for example. If MKS or CGS is not specified, the unit Rayl should be understood to refer to MKS Rayl.

The reflection and transmission coefficients of a sample are quantities whose squared magnitude gives the fraction of the sound energy incident on the sample that is reflected and transmitted, respectively, by the sample. Unless specified otherwise, the reflection and transmission coefficients are for sound normally incident on the sample from air in an impedance tube with anechoic termination. The reflection and transmission coefficients can be determined from the acoustic transfer matrix which can be determined according to the ASTM E2611-17 test standard, for example. In terms of the transfer matrix elements $T_{ij}$ (for the subscripts i and j being 1 or 2) of the acoustic transfer matrix, the air density ρ and the speed of sound c, the squared magnitude of the transmission coefficient is given by $$|t|^2=4/|T_{11}+T_{12}/(\rho c)+\rho c T_{21}+T_{22}|^2.$$

and the squared magnitude of the reflection coefficient is given by $$|r|^2=|T_{11}+T_{12}/(\rho c)-\rho c T_{21}-T_{22}|^2/|T_{11}+T_{12}/(\rho c)+\rho c T_{21}+T_{22}|^2.$$

The air density ρ and the speed of sound c used in these equations can be determined from the measured room temperature and atmospheric pressure as specified in the ASTM E2611-17 test standard, for example. Another quantity characterizing the acoustic transmission is the transmission loss which is given by $-20\log_{10}|t|$. The transmission loss can be measured or calculated for sound normally incident on a single layer or for sound incident on an array of acoustic baffles as described further elsewhere herein.

The average acoustic reflectance, R, of a sample is the squared magnitude of the reflection coefficient of the sample averaged over frequencies in a specified frequency range. The average acoustic transmittance, T, of a sample is the squared magnitude of the transmission coefficient averaged over frequencies in a specified frequency range. The average acoustic absorption, A, of a sample is A=1−R−T, which may also be expressed as the average over frequencies in the specified frequency range of the dissipation coefficient $a_d=1-|r|^2-|t|^2$. Another useful quantity is the acoustic absorption coefficient which is the fraction of the sound energy normally incident on a sample that is absorbed by the sample when the sample is disposed on a sound-reflective plate. The acoustic absorption coefficient can be determined according to the ASTM E1050-12 test standard, for example. Note that in contrast to the reflection and transmission coefficients which generally are complex amplitudes, the absorption coefficient is a real fraction. The average acoustic absorption coefficient, $\alpha$, of a sample is the absorption coefficient of the sample averaged over frequencies in a specified frequency range. The specified frequency range for determining R, T, A, and $\alpha$ will be 1 kHz to 6 kHz, except where a different frequency range is specified.

As used herein, an "acoustically absorptive layer" is a layer having an average acoustic absorption coefficient of at least 0.2. Any layer described as acoustically absorptive may have an average acoustic absorption coefficient greater than 0.2, or greater than 0.25, or greater than 0.3, or greater than 0.35, or greater than 0.4, or greater than 0.5. As used herein, an "acoustically reflective layer" is a layer having an average acoustic reflectance of at least 0.3 and an average acoustic absorption coefficient of no more than 0.15. Any layer described as acoustically reflective may have an average acoustic reflectance greater than 0.35, or greater than 0.4, or greater than 0.45, or greater than 0.5, or greater than 0.6. Any layer described as acoustically reflective may have an average acoustic absorption coefficient less than 0.15, or less than 0.1, or less than 0.05, or less than 0.03, or less than 0.02, or less than 0.01.

Figure 2:
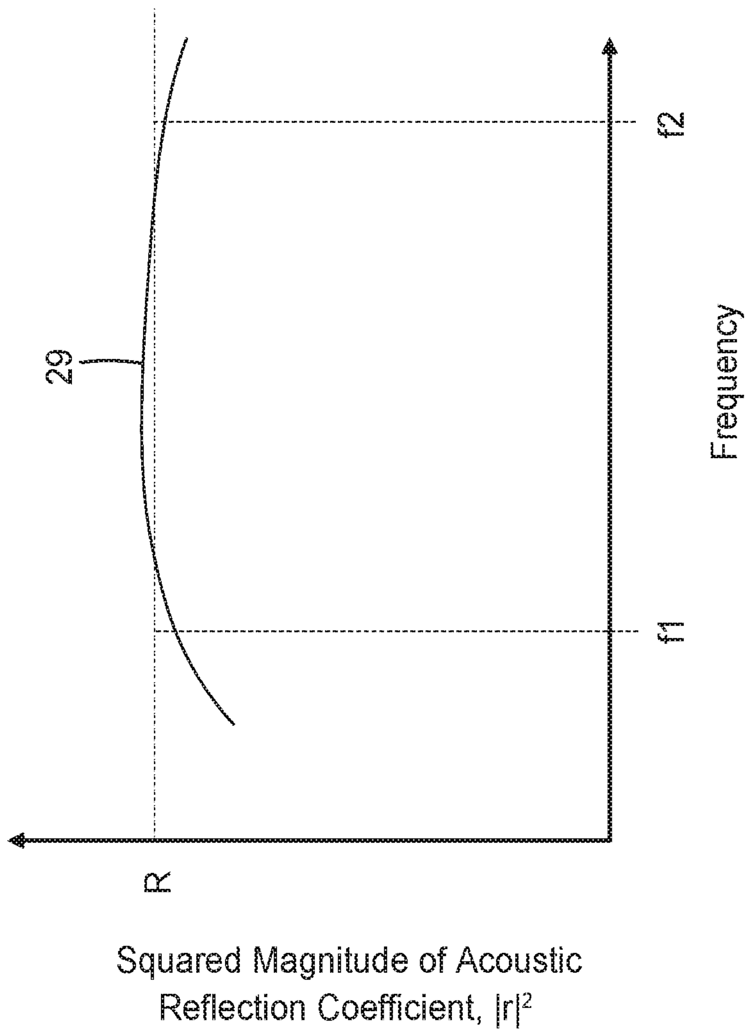
FIG. 2 is a schematic plot of the squared magnitude of an acoustic reflection coefficient as a function of frequency.

FIG. 1 is a schematic plot of the acoustic absorption coefficient, $\alpha$, as a function of frequency for a layer 23, which may be an acoustically absorptive layer, having a relatively high average acoustic absorption coefficient $\alpha 1$ and for a layer 24, which may be an acoustically reflective layer, having a relatively low average acoustic absorption coefficient $\alpha 2$. In some embodiments, $\alpha 1>0.2$ and $\alpha 2<0.05$, for example. FIG. 2 is a schematic plot of the squared magnitude of the acoustic reflection coefficient, $|r|^2$, as a function of frequency for a layer 29, which may be an acoustically reflective layer and/or which may correspond to layer 24. The average, R, of $|r|^2$ may be greater than 0.3, for example. The frequency range averaged over in FIGS. 1-2 is from f1 to f2. In some embodiments, $f1\leq 1$ kHz and $f2\geq 6$ kHz. The quantities $\alpha$ and/or $|r|^2$ may appear differently than schematically illustrated in FIGS. 1-2. For example, multiple peaks and valleys not shown in FIGS. 1-2 may be present in $\alpha$ and/or $|r|^2$.

Useful acoustically absorptive layers include nonwoven layers, woven layers, porous layers, and foam layers. In some embodiments, nonwoven materials are used for an acoustically absorptive layer. A nonwoven layer may be made by mechanically, thermally or chemically entangling fiber or filaments in a web. Any suitable type of nonwoven material may be used. For example, in some embodiments, the nonwoven is a melt-blown nonwoven. The nonwoven material may be flame retardant. Suitable nonwoven materials include those described in U.S. Pat. No. 8,802,002 (Berrigan et al.) and U.S. Pat. No. 9,840,794 (Seidel et al.), and those available from 3M Company (St. Paul, Minn.) under the tradename THINSULATE, those available from Fibertex Nonwovens (Denmark) under the tradename FIBERACOUSTIC, and those available from Freudenberg Performance Materials (Durham, N.C.) under the tradename SOUNDTEX. In some embodiments, the acoustically absorptive layer is or includes a foam layer. Any suitable type of foam layer can be used. For example, a foam layer may a polyurethane foam layer. The foam may be an open cell foam or a closed cell foam. The foam may be a flame retardant foam. Suitable foams include those described in U.S. Pat. No. 5,798,064 (Peterson), U.S. Pat. No. 6,720,362 (Park), U.S. Pat. No. 7,358,282 (Krueger et al.), and those available from Aearo Technologies LLS (Indianapolis, Ind.) under the tradename CONFOR. An acoustically absorptive layer (e.g., a nonwoven layer or an open cell foam layer) can be characterized, for example, by the airflow resistivity of the layer. An acoustically absorptive layer may have an airflow resistivity of at least 5000 MKS Rayl/m, or at least 10000 MKS Rayl/m, or at least 20000 MKS Rayl/m. In some such embodiments, the airflow resistivity is no more than 100000 Rayl/m. In some embodiments, the airflow resistivity is in a range of 10000 to 50000 MKS Rayl/m, for example.

Acoustically reflective layers often have a high specific flow resistance and a low acoustical absorbance. Any layer described as acoustically reflective may have a specific airflow resistance greater than 200 MKS Rayl and an average acoustic absorption coefficient less than 0.05, or may have a specific airflow resistance greater than 400 MKS Rayl and an average acoustic absorption coefficient less than 0.02, or may have a specific airflow resistance greater than 800 MKS Rayl and an average acoustic absorption coefficient less than 0.02, or may have a specific airflow resistance greater than 1000 MKS Rayl and an average acoustic absorption coefficient less than 0.01, for example. Any layer described as acoustically reflective may have a specific airflow resistance greater than 200, 300, 400, 600, 800, 1000, 2000, 3000, or 5000 MKS Rayl as determined according to according to ASTM C522-03.

In some embodiments, a plurality of acoustic baffles (e.g., an array of acoustic baffles) is provided where the acoustic baffles separate a first region from a second region (e.g., in an enclosure). In some embodiments, the acoustic baffles are spaced apart to provide airflow channels between the first and second regions. In some embodiments, the plurality of acoustic baffles results in a transmission loss of at least 10 dB, or at least 12 dB, for at least one frequency in a range of 1 kHz to 15 kHz. In some embodiments, the plurality of acoustic baffles provides an insertion loss (difference between transmission loss with and without the acoustic baffles in place) of at least 5 dB, or at least 8 dB, or at least 10 dB, for at least one frequency in a range of 100 Hz to 20 kHz. In some embodiments, the plurality of acoustic baffles increases a transmission loss between the first and second regions by at least 8 dB for at least one frequency in a range of 1 Hz to 20 kHz. In some embodiments, the plurality of acoustic baffles increases a transmission loss between the first and second regions by at least 10 dB for at least one frequency in a range of 1 Hz to 6 kHz.

Figure 3:
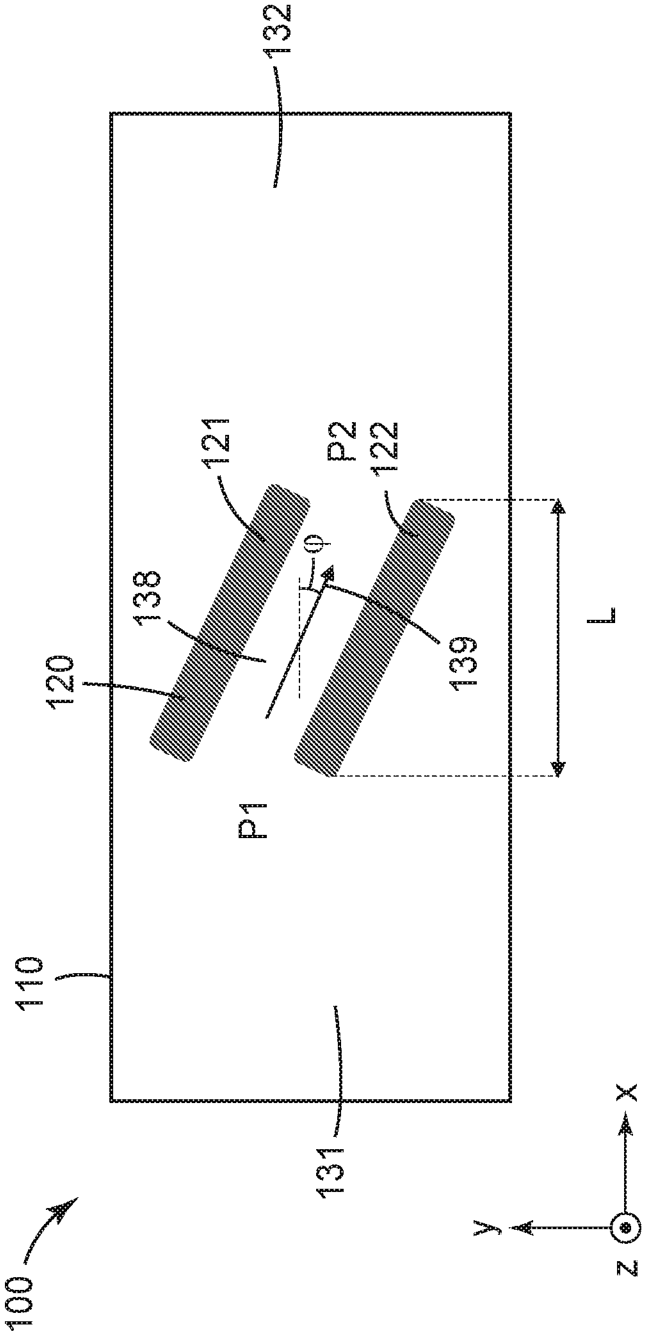
FIG. 3 is a schematic top cross-sectional view of an assembly.

FIG. 3 is a schematic top cross-sectional view (cross-section in x-y plane viewed from above the x-y plane) of an assembly 100 including an enclosure 110. The enclosure 110 includes first and second regions 131 and 132 spaced apart along a first direction (x-direction). The assembly 100 further includes a plurality of spaced apart acoustic baffles 120 arranged along a second direction (y-direction) different from the first direction and disposed in the enclosure 110 between the first and second regions 131 and 132. Two acoustic baffles 120 are schematically shown in FIG. 3. In some embodiments, more than two acoustic baffles 120 are included. The second direction may be orthogonal to the first direction as schematically illustrated in FIG. 3 or the second direction may be at an oblique angle to the first direction, for example. The plurality of spaced apart acoustic baffles 120 can be arranged along the second direction by being arranged linearly along the second direction or by being arranged in a pattern that extends along the second direction (e.g., in a zig-zag pattern extending generally along the second direction, when more than two acoustic baffles are included), for example. In some embodiments, the acoustic baffles 120 are arranged on a straight line which may be orthogonal to the first direction or which may make an oblique angle with the first direction. The plurality of spaced apart acoustic baffles 120 includes adjacent first and second acoustic baffles 121 and 122. In some embodiments, each of the first and second acoustic baffles 121 and 122 includes more than one layer. In some embodiments, the acoustic baffles 120 includes at least one acoustic baffles having more than one layer. The more than one layer can include one or more acoustically absorptive layers, one or more acoustically reflective layers, and/or one or more microperforated panels, for example. The acoustic baffles 120 may be as described for any of acoustic baffles 220, 320, 420, 520, or 620, for example, which are described further elsewhere herein. The acoustic baffles 120 may be substantially planar as schematically illustrated in FIG. 3 or may have a non-planar shape. For example, at least some of the baffles 120 may have a curved shape or a chevron shape. In some embodiments, the first and second acoustic baffles 121 and 122 define a channel 138 therebetween where at least a portion of the channel 138 (substantially all of the channel 138 in the illustrated embodiment) extends along a longitudinal direction 139 making an oblique angle φ with the first direction (x-direction). The acoustic baffles may alternatively be tilted the opposite direction so that φ is negative. In some embodiments, |φ| is in a range of 5 degrees to 60 degrees, or 10 degrees to 40 degrees, for example. The acoustic baffles 120 have a length L along the first direction which may be in a range of 2 cm to 20 cm, for example.

In some embodiments, the assembly 100 is an electronics assembly that includes electronic devices, such as hard disk drives, disposed in second region 132, for example. In some embodiments, the assembly 100 is a ventilation assembly allowing airflow from the first region 131 to the second region 132. For example, the assembly 100 may be a ventilation channel, pathway, or duct. The assembly 100 may be an electronics assembly allowing, or providing (e.g., by including fans in the first region 131), airflow from the first region 131 to or through the second region 132 for cooling electronic devices disposed in the second region. In some embodiments, the enclosure 110 includes panels in the ±z-direction from the illustrated cross-section which aid in restricting the airflow to channels between or adjacent to the baffles 120. In some embodiments, it is desired that the plurality of acoustic baffles 120 attenuate sound propagating from the first region 131 to the second region 132 without producing a substantial pressure drop across the plurality of the acoustic baffles 120. For example, denoting the pressure in the portion of first region 131 adjacent the plurality of acoustic baffles 120 as P1 and the pressure in the portion of the second region 132 adjacent the plurality of acoustic baffles as P2, the pressure drop across the plurality of acoustic baffles, P1-P2, may be less than 20 Pa, or less than 10 Pa, or less than 5 Pa. In some such embodiments, the pressure drop between fans disposed in or proximate to the first region 131 and the electronic devices disposed in the second region 132 may be greater than 200 Pa (e.g., about 300 Pa).

Figure 4:
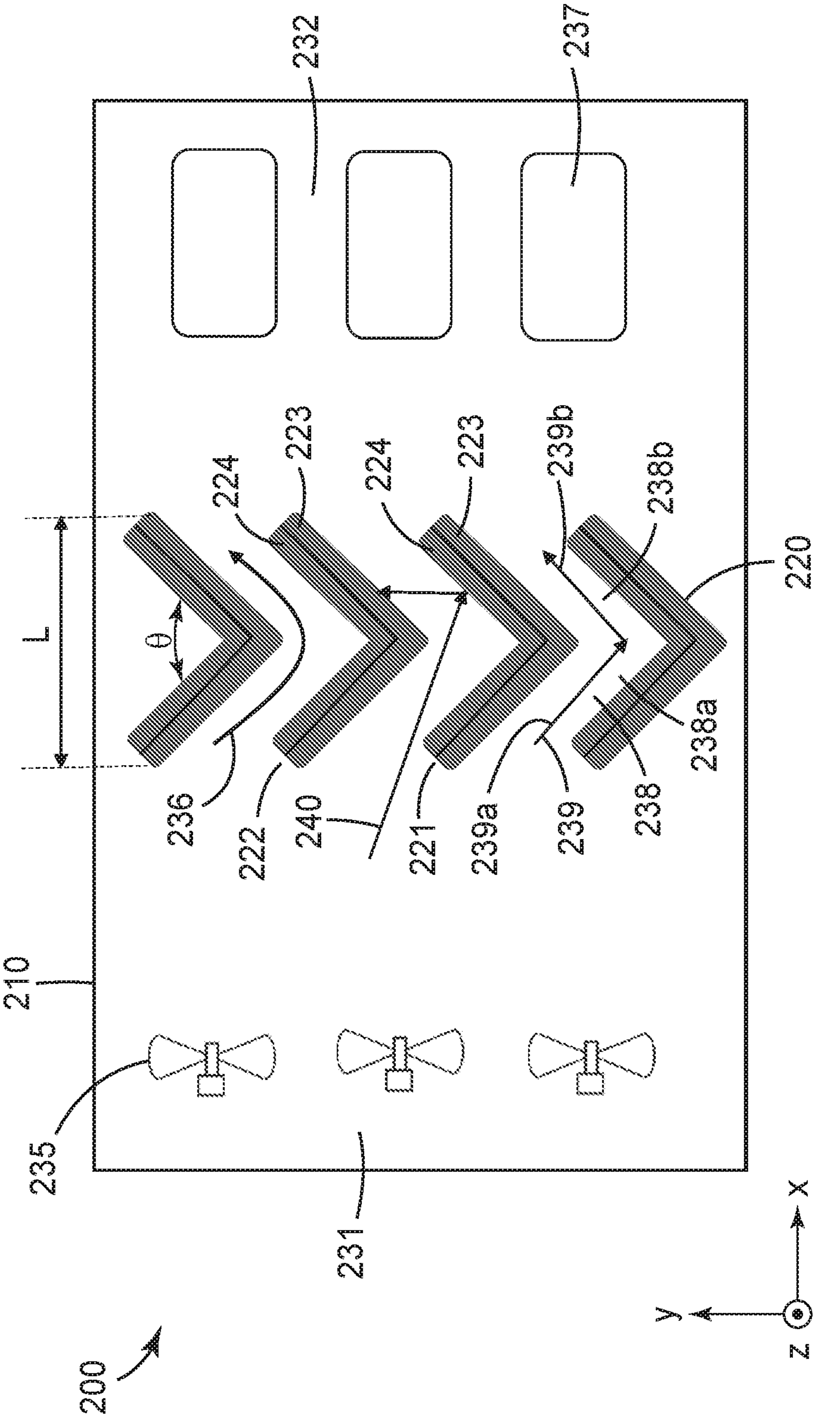
FIG. 4 is a schematic top cross-sectional view of an electronics assembly.

FIG. 4 is a schematic top cross-sectional view of an electronics assembly 200 including an enclosure 210. The enclosure 210 includes first and second regions 231 and 232 spaced apart along a first direction (x-direction). The assembly 200 further includes a plurality of spaced apart acoustic baffles 220 (e.g., an array of acoustic baffles) arranged along a second direction (y-direction) different from the first direction and disposed in the enclosure 210 between the first and second regions 231 and 232. In some embodiments, the acoustic baffles 220 are arranged on a straight line which may be orthogonal to the first direction or which may make an oblique angle with the first direction. In some embodiments, the assembly 200 includes one or more fans disposed in, or proximate to, the first region 231 for providing airflow 236 toward the second region 232. In the illustrated embodiment, a plurality of fans 235 are disposed in the first region 231. In other embodiments, one or more fans are disposed at a boundary of the enclosure 210 to provide airflow across the first region 231. In some embodiments, the assembly 200 includes one or more hard disk drives 237 disposed in the second region 232. In other embodiments, other types of electronic devices are disposed in the second region 232. The pressure drop across the plurality of acoustic baffles 220 may be as described for assembly 100.

The plurality of spaced apart acoustic baffles 220 includes adjacent first and second acoustic baffles 221 and 222. Each of the first and second acoustic baffles 221 and 222 includes a first portion 223 disposed on a second portion 224. The first portion 223 may be an acoustically absorptive layer, which may be a nonwoven layer or a foam layer, for example. The second portion 224 may be a sheet having a specific airflow resistance greater than 200 MKS and/or may be an acoustically reflective layer. In some embodiments, the second portion is or includes a microperforated panel. For example, in some embodiments, the first portion 223 is an acoustically absorptive layer and the second portion 224 includes a microperforated panel and may further include a second acoustically absorptive layer opposite the portion 223. In some embodiments, the first acoustic baffle 221 is concave towards the second acoustic baffle 222. In some embodiments, the first portion 223 (e.g., acoustically absorptive layer) is on a convex side of the acoustic baffle, and the second portion 224 (e.g., acoustically reflective layer) is on a concave side of the acoustic baffle.

In some embodiments, each of the first and second acoustic baffles 221 and 222 has a chevron shape. In some embodiments, each acoustic baffle in at least a majority (e.g., all or all except for acoustic baffles adjacent the side walls) of the plurality of spaced apart acoustic baffles 220 has a chevron shape. In the illustrated embodiment, the acoustic baffles 220 have a chevron shape with a chevron angle θ (angle between sections of the chevron) which may be in a range of 90 degrees to 170 degrees, or 100 degrees to 160 degrees, or 110 degrees to 150 degrees, for example. According to some embodiments, it has been found that reducing the chevron angle reduces a peak transmission loss but increases the transmission loss at higher frequencies and provides broader absorption bandwidth. The acoustic baffles 220 have a length L along the first direction which may be in a range of 2 cm to 20 cm, for example.

In some embodiments, the first and second acoustic baffles 221 and 222 define a channel therebetween, where at least a portion of the channel extends along a longitudinal direction making an oblique angle with the first direction (x-direction). In the illustrated embodiment, the first and second acoustic baffles 221 and 222 have a chevron shape and the channel between the adjacent baffles has two linear portions. For example, channel 238 extends along longitudinal direction 239 and has a first portion 238*a* extending linearly along a first portion 239*a* of the longitudinal direction 239 and has a second portion 238*b* extending linearly along a second portion 239*b* of the longitudinal direction 239. In some embodiments, the plurality of spaced apart acoustic baffles 220 defines a plurality of channels 238 such that each channel 238 is between closest adjacent acoustic baffles, where each channel in at least a majority of the plurality of channels 238 includes at least a portion extending along a longitudinal direction making an oblique angle with the first direction.

In some embodiments, each of the first and second acoustic baffles 221 and 222 include a first acoustically absorptive layer (portion 223) disposed on a first sheet (portion 224) having a specific airflow resistance greater than 200 MKS Rayl. The first sheet may have a specific airflow resistance greater than 200, 300, 400, 600, 800, 1000, 2000, 3000, or 5000 MKS Rayl as determined according to according to ASTM C522-03. In some embodiments, each acoustic baffle in at least a majority of the plurality of spaced apart acoustic baffles 220 includes an acoustically absorptive layer disposed on a sheet having a specific airflow resistance greater than 200 MKS Rayl or in any of the ranges described elsewhere. In some embodiments, the assembly 200 is configured such that at least a portion of sound 240 propagating from the first region toward the second region reflects from the first sheet (portion 224) of the first acoustic baffle 221 and is absorbed by the first acoustically absorptive layer (portion 223) of the second acoustic baffle 222.

In some embodiments, the first sheet is acoustically reflective. In some embodiments, for a frequency range extending at least from 1 kHz to 6 kHz, the first acoustically absorptive layer has an average acoustic absorption coefficient of greater than 0.2 as determined according to ASTM E1050-12, and the first sheet has an average acoustic reflectance of greater than 0.3 as determined from an acoustic transfer matrix determined according to ASTM E2611-17.

In some embodiments, each of the first and second acoustic baffles 221 and 222 includes an acoustically absorptive layer (portion 223) disposed on an acoustically reflective layer (portion 224) where the acoustically reflective layer of the first acoustic baffle 221 faces the acoustically absorptive layer of the second acoustic baffle 222 such that at least a portion of sound 240 propagating from the first region 231 toward the second region 232 reflects from the acoustically reflective layer of the first acoustic baffle 221 and is absorbed by the acoustically absorptive layer of the second acoustic baffle 222.

In some embodiments, each acoustic baffle in at least a majority of the plurality of spaced apart acoustic baffles 220 is as described for the first and second acoustic baffles 221 and 222. In some embodiments, each of the first and second acoustic baffles 221 and 222 is as described for any of acoustic baffles 320, 420, 520, or 620. In some embodiments, each acoustic baffle in at least a majority of the plurality of spaced apart acoustic baffles 220 is as described for any of acoustic baffles 320, 420, 520, or 620.

It has been found that decreasing the spacing between the acoustic baffles results in a higher transmission loss and a shift in the peak transmission loss to a higher frequency. In some embodiments, the plurality of spaced apart acoustic baffles 220 is disposed such that no straight line from the first region 231 to the second region 232 passes between acoustic baffles without intersecting at least one of the acoustic baffles.

The number of acoustic baffles in the plurality of acoustic baffles may be different than schematically illustrated in FIGS. 3-4. In some embodiments, the plurality of acoustic baffles includes a total of 2 to 50, or 3 to 40, or 4 to 30, or 5 to 20 acoustic baffles.

Figure 5:
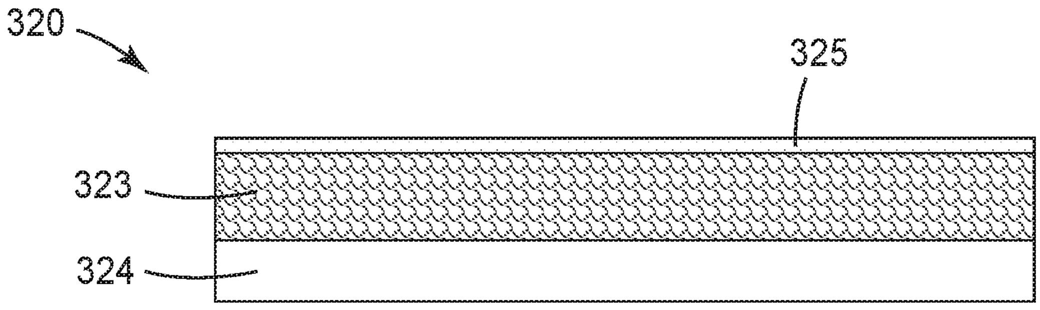
FIGS. 5-6 are schematic cross-sectional views of acoustic baffles.

FIG. 5 is a schematic cross-sectional view of an acoustic baffle 320 including layer 323 disposed on sheet or layer 324. In some embodiments, the acoustic baffle 320 is planar as schematically illustrated in FIG. 5. In other embodiments, the acoustic baffle 320 may have a curved shape or a chevron shape, for example. In some embodiments, layer 323 is a first acoustically absorptive layer and sheet or layer 324 is a first sheet having a specific airflow resistance greater than 200 MKS Rayl. In some embodiments, the first acoustically absorptive layer is or includes a nonwoven layer, and acoustic baffle 320 includes an optional scrim 325 disposed on the nonwoven layer opposite the first sheet. In some embodiments, at least one of the first and second acoustic baffles (e.g., at least one of 121 and 122, or at least one of 221 and 222) includes a scrim 325 disposed on the nonwoven layer opposite the first sheet. In some embodiments, sheet or layer 324 is an acoustically reflective layer. In some such embodiments, the first acoustically absorptive layer is or includes a nonwoven layer, and at least one of, or each of, the first and second acoustic baffles includes a scrim 325 disposed on the nonwoven layer opposite the acoustically reflective layer. In some embodiments, the first acoustically absorptive layer is or includes a first foam layer. In some such embodiments, the optional scrim 325 is omitted.

In some embodiments, the scrim 325 has a specific airflow resistance less than 200 MKS Rayl, or less than 150 MKS Rayl, or less than 100 MKS Rayl, or less than 80 MKS Rayl, or less than 60 MKS Rayl. In some embodiments, for a frequency range extending at least from 1 kHz to 6 kHz, the first acoustically absorptive layer (layer 323) has an average acoustic absorption coefficient of greater than 0.2, or in any range described elsewhere herein for an acoustically absorptive layer, as determined according to ASTM E1050-12. In some embodiments, for a frequency range extending at least from 1 kHz to 6 kHz, the first acoustically absorptive layer (layer 323) has an average acoustic absorption coefficient $\alpha 1$ as determined according to ASTM E1050-12, and the first sheet (sheet or layer 324) has an average acoustic absorption coefficient $\alpha 2$ as determined according to ASTM E1050-12, $\alpha 1>0.2$, $\alpha 2<0.05$. The acoustic absorption coefficients $\alpha 1$ and $\alpha 2$ may be in any of the ranges described elsewhere herein. For example, in some embodiments, $\alpha 1>0.3$ and $\alpha 2<0.02$, or $\alpha 1>0.4$ and $\alpha 2<0.01$.

In some embodiments, the specific airflow resistance of the first sheet (sheet or layer 324) is greater than 300, 400, 600, 800, 1000, 2000, 3000, or 5000 MKS Rayl. In some embodiments, the first sheet has a specific airflow resistance of in a range of 300 MKS Rayl to 5000 MKS Rayl, or in a range of 400 MKS Rayl to 4000 MKS Rayl, for example.

In some embodiments, the sheet or layer 324 is a single layer. In other embodiments, sheet or layer 324 is a sheet that includes more than one layer. In some embodiments, the sheet or layer 324 is a sheet which is or includes a microperforated panel as described further elsewhere herein.

In some embodiments, layer 323 is an acoustically absorptive layer and sheet or layer 324 is an acoustically reflective layer. In some embodiments, the acoustically absorptive layer is or includes a foam layer. In some embodiments, the acoustically absorptive layer is or includes a nonwoven layer. In some embodiments, the acoustically absorptive layer has an airflow resistivity in a range of 10000 to 50000 MKS Rayl/m. In some embodiments, the acoustically absorptive layer has a specific airflow resistance in a range of 100 to 2000 MKS Rayl. For example, a nonwoven layer can have an airflow resistivity and/or a specific airflow resistance in these ranges. In some embodiments, the acoustically reflective layer has a specific airflow resistance greater than 200 MKS Rayl, or greater than 400 MKS Rayl, or in any of the ranges described elsewhere herein. In some embodiments, the acoustically reflective layer has a specific airflow resistance r1 and the acoustically absorptive layer has a specific airflow resistance r2 as determined according to ASTM C522-03. In some embodiments, r1>r2. In some embodiments, for a frequency range extending at least from 1 kHz to 6 kHz, the acoustically absorptive layer has an average acoustic absorption coefficient of greater than 0.2, or greater than 0.3, or in any of the ranges described elsewhere herein, as determined according to ASTM E1050-12. In some embodiments, for a frequency range extending at least from 1 kHz to 6 kHz, the acoustically reflective layer has an average acoustic absorption coefficient as determined according to ASTM E1050-12 of less than 0.05, or less than 0.02, or in any of the ranges described elsewhere herein. In some embodiments, for a frequency range extending at least from 1 kHz to 6 kHz, the acoustically absorptive layer has an average acoustic absorption coefficient $\alpha 1$ as determined according to ASTM E1050-12, and the acoustically reflective layer has an average acoustic absorption coefficient $\alpha 2$ as determined according to ASTM E1050-12, where $\alpha 1>0.2$ and $\alpha 2<0.05$, or $\alpha 1$ and $\alpha 2$ can be in any of the ranges described elsewhere herein for acoustically absorptive and reflective layers, respectively. In some embodiments, for a frequency range extending at least from 1 kHz to 6 kHz, the acoustically reflective layer has an average acoustic reflectance as determined from an acoustic transfer matrix determined according to ASTM E2611-17 of greater than 0.3, or greater than 0.4, or in any of the ranges described elsewhere herein.

In some embodiments, the acoustically reflective layer has a specific airflow resistance greater than 5000 MKS Rayl. In some embodiments, the acoustically reflective layer is or includes an impermeable polymeric film. An impermeable film does not include pores or perforations that would allow nonnegligible airflow through the film and so can have a high (e.g., greater than 5000 MKS Rayl, or greater than 10000 MKS Rayl) specific airflow resistance. Suitable polymeric materials for making acoustically reflective polymeric films include polyolefins, polyesters, nylons, polyurethanes, polycarbonates, polysulfones, polypropylenes, polyvinylchlorides, and combinations thereof, for example. Copolymers and blends may also be used.

The layers of the acoustic baffle 320, or other acoustic baffles described herein, can function synergistically with other layers of the acoustic baffle and/or with other acoustic baffles in a plurality of the acoustic baffles. In some embodiments, at least a portion of sound incident on layer 324 is reflected from layer 324 and is absorbed by an adjacent acoustic baffle. In some embodiments, and additional acoustically absorptive layer is disposed on layer 324 opposite layer 323. In such embodiments, the additional acoustically absorptive layer can absorb at least a portion of the sound reflected from layer 324. In some embodiments, a portion of sound incident on layer 324 is transmitted through layer 324 and is absorbed by layer 323. In some embodiments, at least a portion of sound incident on layer 323 (through layer 325, when included) is absorbed by layer 323 before reaching layer 324. In some embodiments, at least a portion of sound incident on layer 323 (through layer 325, when included) is transmitted through layer 323, reflected from layer 324, and then absorbed by layer 323. In some embodiments, layer 324 includes a microperforated panel as described elsewhere herein that is configured to absorb sound more strongly for at least some frequencies than the layer 323 or the additional acoustically absorptive layer if included. In some such embodiments, at least a portion of sound incident on layer 324 (e.g., after being transmitted by layer 323 or the additional layer) is absorbed by layer 324.

Figure 6:
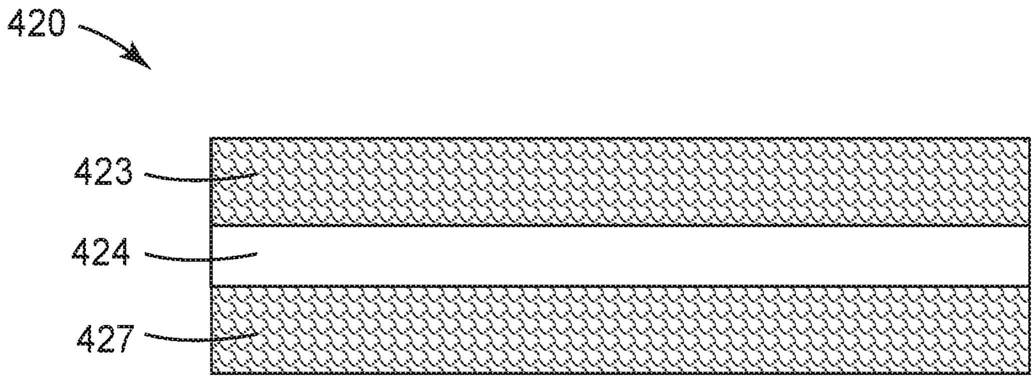

FIG. 6 is a schematic cross-sectional view of an acoustic baffle 420 including first layer 423 disposed on sheet or layer 424 and including a second layer 427 disposed on the sheet or layer 424 opposite the first layer 423. In some embodiments, the acoustic baffle 420 is planar as schematically illustrated in FIG. 4. In other embodiments, the acoustic baffle 420 may have a curved shape or a chevron shape, for example. The first layer 423 and/or the second layer 427 may be one or more of a nonwoven layer, a porous layer, a foam layer, and/or an acoustically absorptive layer. The sheet or layer 424 may be one or more of a sheet having a specific airflow resistance greater than 200 MKS Rayl, an acoustically reflective layer, or a microperforated panel.

In some embodiments, each of the first and second acoustic baffles (e.g., 121 and 122, or 221 and 222) includes a first acoustically absorptive layer (e.g., layer 423) disposed on a first sheet (e.g. sheet or layer 424) and includes a second acoustically absorptive layer (e.g., layer 427) disposed on the first sheet opposite the first acoustically absorptive layer. In some embodiments, each acoustic panel in at least a majority of the acoustic panels includes a first acoustically absorptive layer disposed on a first sheet, and includes a second acoustically absorptive layer disposed on the first sheet opposite the first acoustically absorptive layer. In some embodiments, each of the first and second acoustic baffles (e.g., 121 and 122, or 221 and 222) includes a first acoustically absorptive layer (e.g., layer 423) disposed on a first sheet (e.g. sheet or layer 424). In some embodiments, each of the first and second acoustic baffles further includes a second acoustically absorptive layer (e.g., layer 427) disposed on the first sheet opposite the first acoustically absorptive layer. In some embodiments, each acoustic panel in at least a majority of the acoustic panels includes a first acoustically absorptive layer disposed on a first sheet, and includes a second acoustically absorptive layer disposed on the first sheet opposite the first acoustically absorptive layer. In some embodiments, the first acoustically absorptive layer includes a first nonwoven layer, and the second acoustically absorptive layer includes a second nonwoven layer. In some embodiments, the first acoustically absorptive layer includes a first foam layer, and the second acoustically absorptive layer includes a second foam layer. In some embodiments, the first acoustically absorptive layer includes a nonwoven layer, and the second acoustically absorptive layer includes a foam layer.

In some embodiments, each of the first and second acoustic baffles (e.g., 121 and 122, or 221 and 222) includes an acoustically absorptive layer (e.g., layer 423) disposed on an acoustically reflective layer (e.g., sheet or layer 424). In some embodiments, the acoustically absorptive layer is at least one of a nonwoven layer, a porous layer, or a foam layer. In some embodiments, each of the first and second acoustic baffles further includes an additional layer (e.g., layer 427) disposed on the acoustically reflective layer opposite the acoustically absorptive layer. In some embodiments, each acoustic panel in at least a majority of the acoustic panels includes an acoustically absorptive layer disposed on an acoustically reflective layer, and includes an additional layer disposed on the acoustically reflective layer opposite the acoustically absorptive layer. In some embodiments, the additional layer is an acoustically absorptive layer. In some embodiments, the additional layer is at least one of a nonwoven layer, a porous layer, or a foam layer.

In some embodiments, an acoustic baffle includes first and second acoustically absorptive layers and a microperforated panel disposed therebetween. As used herein, a "microperforated panel" is a panel that includes at least one layer with a plurality of holes (perforations) extending entirely through the layer where the holes have at least one diameter (lateral distance across the hole passing through a center of the hole in a lateral cross-section through the hole) less than 1 mm and at least 1 micrometer. A microperforated panel can include more than one microperforated layer. For example, a microperforated panel may include first and second microperforated layers (e.g., microperforated polymer films) spaced apart by a spacer layer, where the spacer layer includes a plurality of open cells defined by sidewalls extending along a thickness direction of the spacer layer. In some cases, a microperforated layer of a microperforated panel is acoustically reflective (e.g., a microperforated film with a sufficiently small perforation density that the film reflects at least 20% of normally incident sound energy). In some cases, a microperforated panel has at least one acoustic absorption band. In some cases, a microperforated panel has a specific airflow resistance of at least 200 MKS Rayl (e.g., a panel using microperforated films with sufficiently small perforation densities that the panel has such a specific airflow resistance). In some embodiments, a microperforated panel has a specific airflow resistance in a range of 200 MKS Rayl to 5000 MKS Rayl, or 400 MKS Rayl to 4000 MKS Rayl.

In some embodiments, an acoustic baffle is provided. In some embodiments, the acoustic baffle includes first and second acoustically absorptive layers and a microperforated panel disposed therebetween, where the microperforated panel includes first and second microperforated layers spaced apart by a spacer layer including a plurality of open cells defined by sidewalls extending along a thickness direction of the spacer layer. In some embodiments, the acoustic baffle has a chevron shape. In some embodiments, an array of the acoustic baffles is provided.

In some embodiments, the plurality of spaced apart acoustic baffles (e.g., 120 or 220) includes at least one acoustic baffle including first and second acoustically absorptive layers and a microperforated panel disposed therebetween. In some embodiments, the at least one acoustic baffle includes adjacent first and second acoustic baffles (e.g., 121 and 122, or 221 and 222). In some embodiments, the first and second acoustic baffles define a channel therebetween where at least a portion of the channel extends along a longitudinal direction making an oblique angle with a first direction between first and second regions of an enclosure, as described further elsewhere herein. In some embodiments, the at least one acoustic baffle includes at least a majority of the acoustic baffles in the plurality of spaced apart acoustic baffles.

Figure 7A:
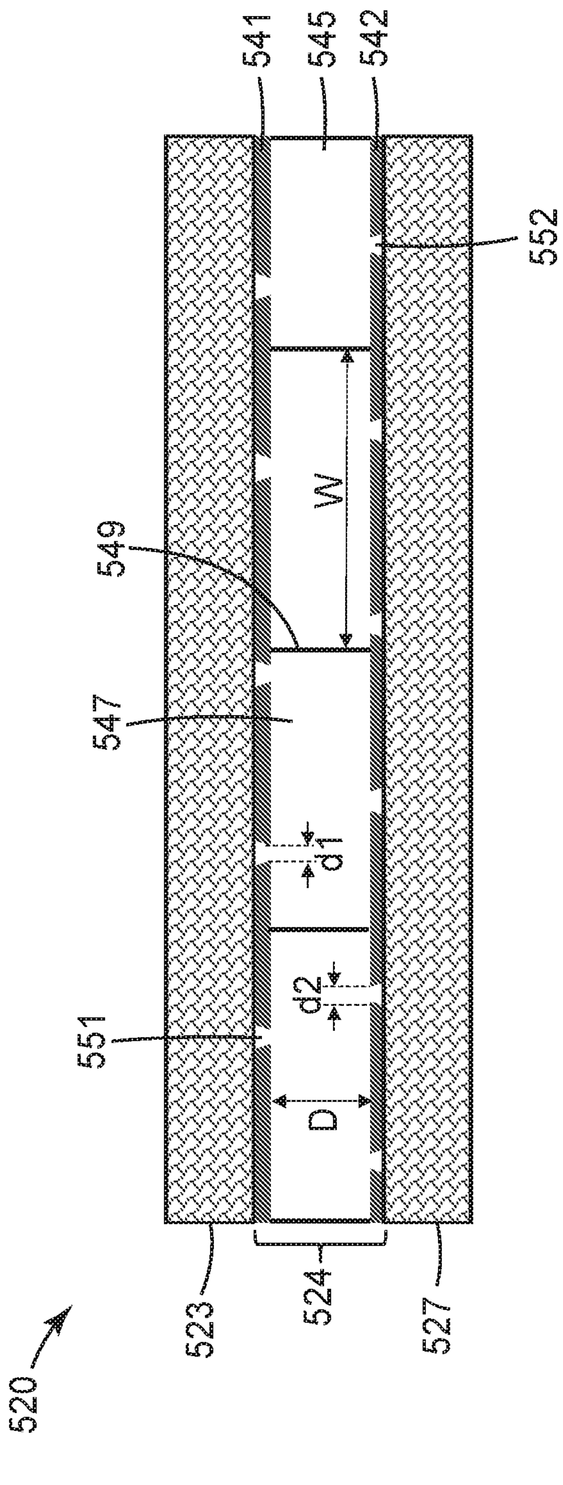
FIG. 7A is a schematic cross-sectional view of an acoustic baffle including a spacer layer.

FIG. 7A is a schematic cross-sectional view of an acoustic baffle 520 including first and second acoustically absorptive layers 523 and 527 and a microperforated panel 524 disposed therebetween. Microperforated panel 524 includes first and second microperforated layers 541 and 542 and a spacer layer 545 therebetween. First microperforated layer 541 has perforations having an average diameter d1 at an inner surface (surface facing the spacer layer 545) of the layer. Second microperforated layer 542 have perforations having an average diameter d2 at an inner surface of the layer, which may be equal to d1. In some embodiments, each of d1 and d2 is less than 1 mm and greater than 1 micrometer. In some embodiments, each of d1 and d2 is in a range of 2 micrometers to 800 micrometers, or 20 micrometers to 400 micrometers, or 30 micrometers to 200 micrometers. Suitable microperforated layers include those described in U.S. Pat. Ns. 6,598,701 (Wood et al.), U.S. Pat. No. 6,617,002 (Wood), and U.S. Pat. No. 6,977,109 (Wood). The microperforated layers can be made by embossing a plurality of cavities in a film and using a flame treatment process to open the cavities to provide holes through the layer. Such processes are described in U.S. Pat. No. 9,238,203 (Scheibner et al.), for example.

First and second first and second microperforated layers 541 and 542 include respective microperforations 551 and 552. The microperforations 551 and/or 552 may be funnel-shaped with one end being a wide end and the other end being a narrow end. The wide end may face an outside of the panel 524 and the narrow end may face the cells 547 of the panel 524. The narrow end may have a narrowest diameter that is smaller than the thickness of the microperforated layer. The shape of the opening of the microperforations may be circular, square, hexagonal, or any other suitable shape. In some embodiments, microperforations have a substantially circular cross section. The microperforations may be disposed in a regular (e.g., rectangular or square array, or hexagonal array) or irregular pattern.

The microperforated layers 541 and 542 may be microperforated films (e.g., microperforated polymeric films). Suitable polymeric materials for making polymeric films include polyolefins, polyesters, nylons, polyurethanes, polycarbonates, polysulfones, polypropylenes, polyvinylchlorides, and combinations thereof, for example. Copolymers and blends may also be used. The microperforated layers 541 and 542 may each have a thickness in a range of 50 micrometers to 2000 micrometers, or 100 micrometers to 1000 micrometers, or 200 micrometers to 500 micrometers, for example.

The perforations of the microperforated layers may have a narrowest diameter (e.g., d1 and/or d2) of 30 micrometers or greater, 40 micrometers or greater, 50 micrometers or greater, 60 micrometers or greater, 70 micrometers or greater, 80 micrometers or greater, 90 micrometers or greater, or 100 micrometers or greater. The perforations of the microperforated film may have a narrowest diameter of up to 200 micrometers, up to 150 micrometers, up to 120 micrometers, up to 100 micrometers, up to 90 micrometers, or up to 80 micrometers.

The perforations of the microperforated layers may have a widest diameter (e.g., the width at the wide end) of 100 micrometers or greater, 150 micrometers or greater, 180 micrometers or greater, 200 micrometers or greater, 220 micrometers or greater, 230 micrometers or greater, 240 micrometers or greater, or 250 micrometers or greater. The perforations of the microperforated film may have a widest diameter of up to 1000 micrometers, up to 800 micrometers, up to 700 micrometers, up to 650 micrometers, up to 600 micrometers, up to 550 micrometers, up to 500 micrometers, up to 450 micrometers or up to 400 micrometers.

The perforations of the microperforated layers may have a pitch (distance from center to center of adjacent perforations) of 300 micrometers or greater, 400 micrometers or greater, 500 micrometers or greater, or 600 micrometers or greater. The perforations of the microperforated layers may have a pitch of up to 2000 micrometers, up to 1500 micrometers, up to 1200 micrometers, or up to 1000 micrometers.

Figure 7B:
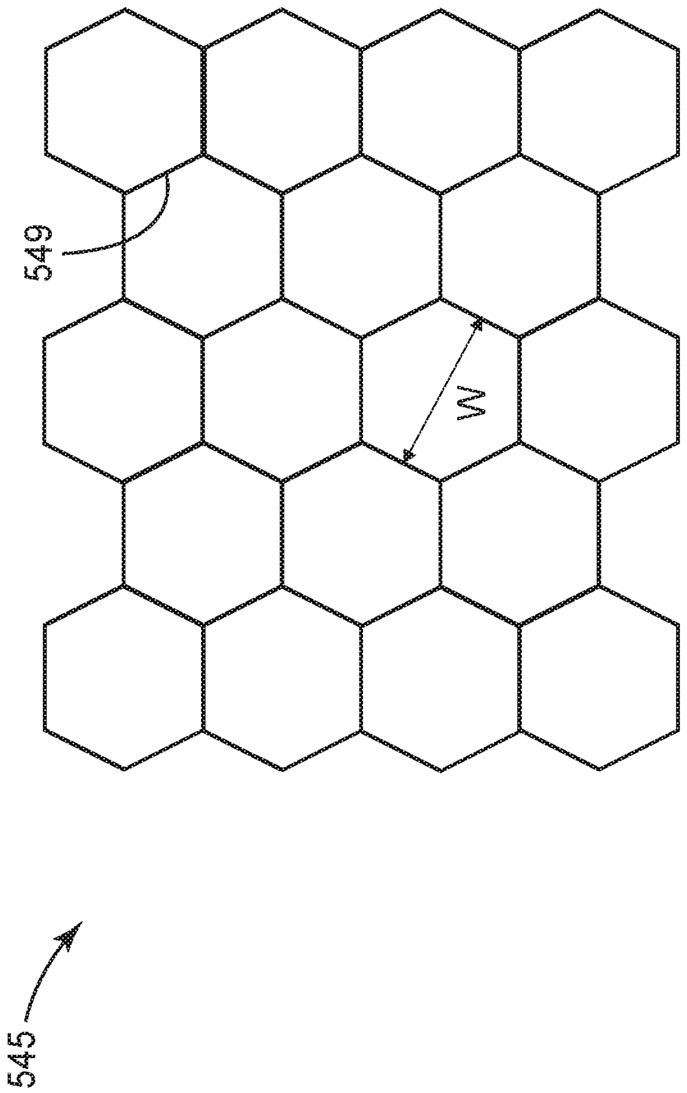
FIG. 7B is a schematic top view of the spacer layer of the acoustic baffle of FIG. 7A.

FIG. 7B is a schematic top view of the spacer layer 545 according to some embodiments. The spacer layer 545 includes a plurality of open cells 547 (e.g., having open tops and bottoms) defined by sidewalls 549 extending along a thickness direction of the spacer layer 545. The thickness direction of the spacer layer 545 is generally perpendicular to the layer and is a direction between, and normal to, the first and second microperforated layers 541 and 542. Suitable spacer layers include honeycomb layers as schematically illustrated in FIG. 7B. Other cell geometries may be used. In some embodiments, the cells 547 have a regular geometric shape, such as a polygonal shape. Exemplary shapes include triangles, squares, rectangles, pentagons, hexagons, heptagons, octagons, etc., and combinations thereof. The cells 547 may have an irregular shape and may include curved and/or straight sections, for example. The series of cells 547 may form a pattern. The pattern may be regular (e.g., as schematically illustrated in FIG. 7B) or irregular. The spacer layer 545 may be a core layer as described in U.S. Pat. Appl. Publ. No. 2019/0213990 (Jonza et al.), for example.

The cells 547 may have a depth D that is may be may in range of 1 mm to 30 mm, or 2 mm to 25 mm, or 5 mm to 20 mm, for example. for example. The cells 547 may have a width W in a range of 1 mm to 30 mm, or 2 mm to 20 mm, or 3 mm to 10 mm, for example. In some embodiments, the acoustic characteristics of the microperforated panel are adjusted, in part, by selecting properties of the spacer layer 545. For example, one or more of the depth D, width W, and number of cells 547 may be adjusted to alter the acoustic absorption of the acoustic baffle 520 in one or more frequency ranges. In some embodiments, the panel 524 includes at least 5 cells (e.g., 5-20 cells) along the downstream length (length along the first direction) of the panel. In other embodiments, the panel 524 includes 1 to 4 cells. In some embodiments, the panel 524 includes only one cell so that the spacer layer 545 is air space except for sidewalls 549 at boundaries of the layer. Openings in the walls between adjacent cells may optionally be included as described in U.S. Pat. Appl. Publ. No. 2019/0213990 (Jonza et al.), for example. In addition, acoustically absorptive material (e.g., fibrous material) may optionally be disposed in the cells 547. In some embodiments one or more of the size and/or shape of the microperforations, physical properties of the microperforated layers, hole spacing (e.g., pitch), cell width, and cell depth, may be adjusted to adjust (e.g., tune) the absorption bands of the panel. For example, in some embodiments, a peak absorption frequency can be increased by having fewer number of cells in a series of cells, by decreasing the size of individual cells (e.g., by decreasing the width W of the cells or the depth D of the cells), by increasing the size of the through holes in the first and/or second layers, by including or increasing a size of openings in the walls between adjacent cells, or by decreasing the thickness of the first and/or second microperforated layers. The opposite adjustments can be used to decrease the peak absorption frequency.

In some embodiments, the plurality of spaced apart acoustic baffles (e.g., 120 or 220) includes at least one acoustic baffle 520 including first and second acoustically absorptive layers and a microperforated panel disposed therebetween. In some embodiments, the acoustic baffle 520 is planar as schematically illustrated in FIG. 7A. In other embodiments, the acoustic baffle 520 may have a curved shape or a chevron shape, for example. In some embodiments, each acoustic baffle in at least a majority of the plurality of spaced apart acoustic baffles has a chevron shape.

In some embodiments, the spacer layer 545 is formed from at least one of polymeric, metallic, or composite materials. Useful polymeric materials include polyethylenes, polypropylenes, polyolefins, polyvinylchlorides, polyurethanes, polyesters, polyamides, polystyrene, copolymers thereof, and combinations thereof (including blends). The polymeric materials may be thermosetting by, for example, heat or ultraviolet (UV) radiation, or thermoplastic. Other useful materials are described in U.S. Pat. Appl. Publ. No. 2019/0213990 (Jonza et al.), for example. In some embodiments, the spacer layer 545 is made into a desired shape (e.g., a chevron shape) by thermoforming, insert molding, or compression molding, for example. In some embodiments, the first and second microperforated layers 541 and 542 are bonded to the spacer layer 545 by applying adhesive to top and bottom surfaces of the sidewalls 549 so that the first and second microperforated layers 541 and 542 bond to the top and bottom surfaces of the sidewalls 549 leaving the microperforations 551 and 552 substantially free of adhesive.

In some embodiments, at least one of first and second acoustically absorptive layers 523 or 527 is or includes a nonwoven layer. In some embodiments, at least one of first and second acoustically absorptive layers 523 or 527 is or includes a foam layer. In some embodiments, for a frequency range extending at least from 1 kHz to 6 kHz, each of the first and second acoustically absorptive layers 523 and 527 has an average acoustic absorption coefficient of greater than 0.2, or in any range described elsewhere herein, as determined according to ASTM E1050-12.

According to some embodiments, it has been found that including the acoustically absorptive layers 523 and 527 increases a bandwidth for a specified transmission loss. For example, a plurality of the acoustic baffles 520 may provide a transmission loss of at least 8 dB over a first frequency range that is at least 5 percent or at least 10 percent greater than a second frequency range where an otherwise equivalent plurality of acoustic baffles that do not include the layers 523 and 527 provides a transmission loss of at least 8 dB.

Figure 8:
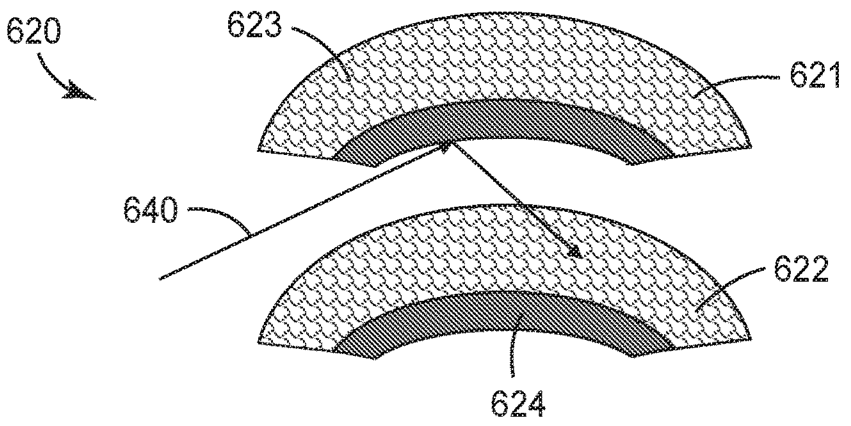
FIG. 8 is a schematic top view of a plurality of spaced apart acoustic baffles.

FIG. 8 is a schematic top view of a plurality of spaced apart acoustic baffles 620 including first and second acoustic baffles 621 and 622 each having a curved shape. The acoustic baffles 620 include a first layer 623 disposed on a second layer 624. The first layer 634 may be one or more of a nonwoven layer, a foam layer, or an acoustically absorptive layer, for example. The second layer 624 may be one or more of a sheet having a specific airflow resistance greater than 200 MKS Rayl or an acoustically reflective layer, for example. The second layer of the first acoustic baffle 621 faces the first layer of the second acoustic baffle 622. In some embodiments, at least a portion of sound 640 incidence on the plurality of spaced apart baffles 620 is reflected from the second layer of the first acoustic baffle 621 and is absorbed by the first layer of the second acoustic baffle 622.

Figure 9:
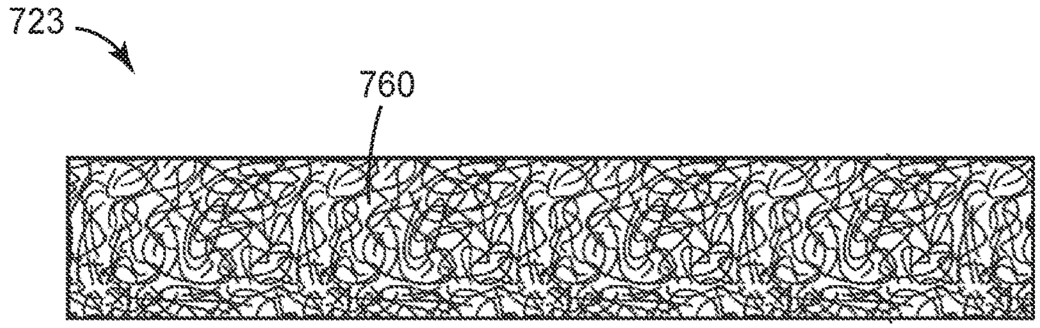
FIG. 9 is a schematic cross-sectional view of a nonwoven layer.

FIG. 9 is a schematic cross-sectional view of a nonwoven layer 723 including fibers 760. In some embodiments, the fibers 760 include a plurality of melt-blown fibers including a thermoplastic polymer blended with at least one of a phosphinate or a polymeric phosphonate. In some embodiments, a 20-millimeter thick sample of the nonwoven layer 723 is capable of passing one or more flammability tests selected from UL 94 V0, UL94 VTM, and FAR 25.856(a).

Suitable thermoplastic polymers include polyolefins such as polypropylene and polyethylene, polyesters such as polyethylene terephthalate and polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefins, along with copolymers and blends thereof. Additional details on thermoplastic polymers useful for making nonwoven materials (e.g., nonwoven fibrous webs) can be found in, for example, U.S. Pat. No. 7,757,811 (Fox et al.) and U.S. Pat. No. 9,194,065 (Moore et al.).

The thermoplastic polymers used to make the nonwoven layer may be blended with a phosphorus-containing polymer. The phosphorus-containing polymer preferably contains at least one phosphinate or polymeric phosphonate, the latter also sometimes referred to as a polyphosphonate.

Phosphinates are organophosphorus compounds having the general formula $R_2(R_1O)P{=}O$, with a structure similar to that of hypophosphorous acid. Phosphonates are organophosphorus compounds containing $C{-}PO(OH)_2$ or $C{-}PO(OR)_2$ groups, where R represents an alkyl or aryl group. Polymeric phosphonates are polymers that contain phosphonates in their repeat units.

Phosphinates, polymeric phosphonates and their derivatives are useful additives for their flame-retardant properties. Polymeric flame-retardants can be advantageous over non-polymeric alternatives because of their lower volatility, decreasing leaching tendency, and improved compatibility with base polymers.

Advantageously, phosphorus-based flame-retardants are effective without use of halogens such as bromine, chlorine, fluorine, and iodine, enabling the non-woven fibrous web to be made substantially free of any halogenated flame-retardant additives. Use of halogenated compounds have been disfavored for environmental, health and safety reasons.

Polymeric phosphonate homopolymers can be brittle at ambient temperatures, and this brittleness can be mitigated by copolymerizing polymeric phosphonates with a thermoplastic polymer. Thermoplastic polymers that can be used for this purpose include, for example, polyethylene terephthalate, polyethylene, and polycarbonate. Copolymerized products include random or block copolymers.

The polymeric phosphonate may be a polymeric phosphonate, copoly(phosphonate ester), copoly(phosphonate carbonate). These polymers, broadly construed herein to include oligomers, can include repeating units derived from diaryl alkyl- or diaryl arylphosphonates. In some instances, the polymeric phosphonate includes an oligophosphonate, random co-oligo(phosphonate ester), block co-oligo(phosphonate ester), random co-oligo(phosphonate carbonate), and/or block co-oligo(phosphonate carbonate).

In some embodiments, the polymeric phosphonate contains one or more phenolic end groups. If desired, the phenolic end groups can be reactive with functional groups present on the thermoplastic polymer used in the melt-blown fibers of the provided fibrous non-woven webs.

The phosphorus content in the additive can be directly correlated with the degree of flame retardancy in the provided webs. The polymeric phosphonate can have a phosphorus content in the range from 1 wt % to 50 wt %, from 5 wt % to 50 wt %, from 5 wt % to 30 wt %, or in some embodiments, less than, equal to, or greater than 1 wt %, 2, 3, 4, 5, 6, 7, 8, 9, 10, 12, 15, 17, 20, 22, 25, 27, 30, 35, 40, 45, or 50 wt %, based on the overall weight of the polymeric phosphonate.

Useful phosphinate compounds include those that are meltable at temperatures used in melt blowing processes. Meltable phosphinate compounds can, for example, have a melting temperature of less than, equal to, or greater than 100, 110, 120, 130, 140, 150, 160, 170, 180, 190, 200, 210, 220, 230, 240, 250, 260, 270, 280, 290, or 300° C.

Further details concerning the preparation and chemical and physical properties of phosphinate and polymeric phosphonate materials can be found in, for example, U.S. Pat. Nos. 4,719,279 (Kauth et al.); U.S. Pat. No. 6,861,499 (Vinciguerra et al.); and U.S. Pat. No. 9,695,278 (Kagumba et al.); and U.S. Patent Appl. Pub. Nos. 2006/0020064 (Bauer et al.) and 2012/0121843 (Lebel et al.); and U.S. Prov. Appl. No. 62/746386 filed on Oct. 16, 2018 and titled "Flame-Retardant Non-Woven Fibrous Webs".

In some embodiments, one or more of the acoustic baffles are formed into a desired (e.g., non-planar) shape by thermoforming. For example, a chevron shape (see, e.g., FIG. 4) or a curved shape (see, e.g., FIG. 8) can be obtained by thermoforming. In some embodiments, at least one of the first and second acoustic baffles (e.g., 121 and 122, or 221 and 222, or 621 and 622) is thermoformed into a non-planar shape.

Figure 10:
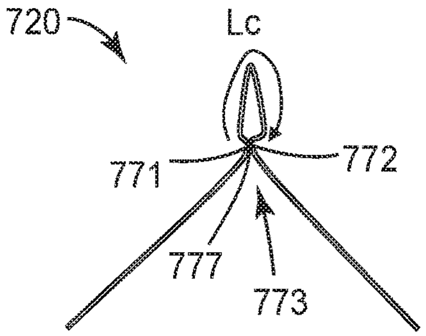
FIGS. 10-11 are schematic top views of acoustic baffles.

In some embodiments, one or more of the acoustic baffles are formed into a desired shape by attaching two regions in an otherwise flat baffle together. This is schematically illustrated in FIG. 10 which is a schematic cross-sectional view of an acoustic baffle where first and second portions 771 and 772 are attached together at region 773. The desired shape may be a substantially chevron shape (e.g., a shape that generally follows a chevron away from the region 773). The first and second portions 771 and 772 have different locations along a length (e.g., along an arclength) of the acoustic baffle 720. In the illustrated embodiments, the first and second portions 771 and 772 contact one another at region 773, but are separated along the length of the acoustic baffle 720 by a length Lc. The first and second portions 771 and 772 are attached through attachment 777 which can schematically represent stitching (e.g., pleat or dart), or melt bonding, or ultrasonic bonding, or a combination thereof, for example. Using pleats and/or darts to shape a body including a nonwoven layer are described in U.S. Pat. No. 9,603,395 (Duffy) and International Appl. Pub. No. WO 2019/135150 (Duffy), for example. In some embodiments, at least one of the first and second acoustic baffles (e.g., 121 and 122, or 221 and 222, or 621 and 622) includes at least one sewing dart. In some embodiments, at least one of the first and second acoustic baffles includes at least one pleat. In some embodiments, at least one of the first and second acoustic baffles includes at least one region 773 where first and second portions (e.g., first and second portions 771 and 772) of the acoustic baffle having different locations along a length of the acoustic baffle are attached to one another by one or more of stitching, melt bonding, or ultrasonic bonding.

Figure 11:
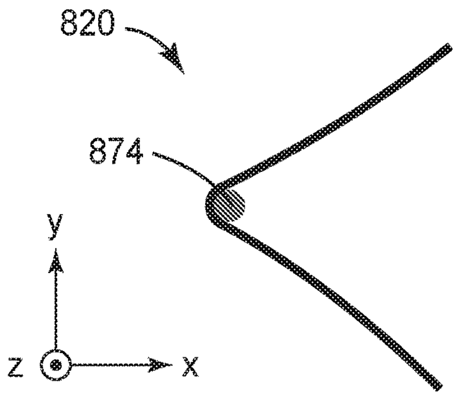

In some embodiments, one or more of the acoustic baffles are formed into a desired shape by wrapping the layers of the acoustic baffle around an elongated member. The desired shape may be a substantially chevron shape (e.g., a chevron shape except possibly near the elongated member). An inner layer of the baffle may be bonded to the elongated member or the layers of the baffle may be stitched together adjacent the elongated member. FIG. 11 is a schematic top view of an acoustic baffle 820 including an elongated member 874 extending in the z-direction. The baffle 820 may include absorptive and acoustically reflective layers as described elsewhere herein. In some embodiments, at least one of the first and second acoustic baffles (e.g., 121 and 122, or 221 and 222, or 621 and 622) includes an elongated member 874 extending along a third direction (z-direction) orthogonal to the first and second directions (x- and y-directions), where the absorptive and acoustically reflective layers of the acoustic baffle 820 are wrapped at least partially around the elongated member 874. The baffle 820 may include a first acoustically absorptive layer (e.g., a nonwoven layer or a foam layer) and a first sheet as described elsewhere herein. In some embodiments, at least one of the first and second acoustic baffles (e.g., 121 and 122, or 221 and 222, or 621 and 622) includes an elongated member 874 extending along a third direction (z-direction) orthogonal to the first and second directions (x- and y-directions), where the first acoustically absorptive layer and first sheet of the acoustic baffle 820 are wrapped at least partially around the elongated member 874.

Figure 12:
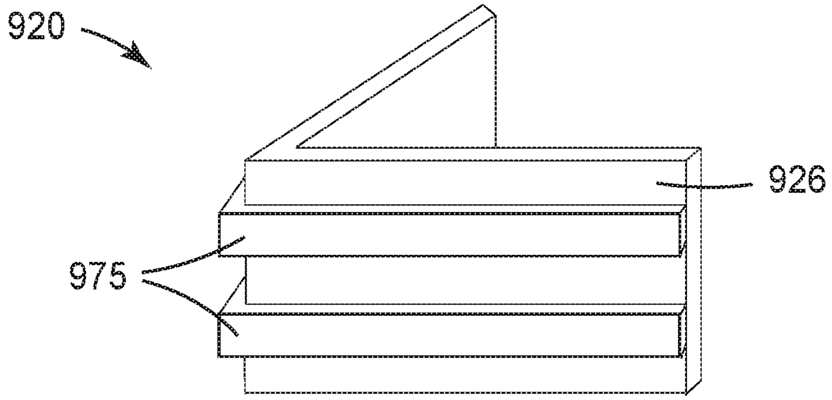
FIG. 12 is a schematic perspective view of an acoustic baffle.

FIG. 12 is a schematic side perspective view of an acoustic baffle 920 including one or more shaped members 975 bonded to an adjacent layer 926 of the acoustic baffle 920 where the one or more shaped members hold the acoustic baffle in a chevron shape. The one or more shaped members 975 include two shaped members in the illustrated embodiment. In other embodiments, one of the two shaped members is omitted, and in still other embodiments, a third (or more) shaped member is included. The shaped members 975 may be bent strips or molded strips, for example. In some embodiments, the one or more shaped members 975 includes at least one metal strip bent to a desired shape (e.g., adapted to hold the acoustic baffle in a chevron shape). In some embodiments, the one or more shaped members 975 is or includes a molded frame. For example, each strip may be molded and considered to be a molded frame, or a single unitary molded frame including a plurality of strips may be used.

Another technique that can be used to provide an acoustic baffle with a desired shape to provide different tensions in outermost layers of the acoustic baffle when the acoustic baffle is formed. For example, layer 324 can be stretched before being attached to layer 323 of acoustic baffle 320. When the tension is relaxed, the acoustic baffle will form a curved shape. In some embodiments, the layer 325 and the layer 324 can have different nonzero tensile stresses. In some embodiments, outermost layers of at least one of the first and second acoustic baffles (e.g., 121 and 122, or 221 and 222, or 621 and 622) has different nonzero tensile stresses.

Figure 13:
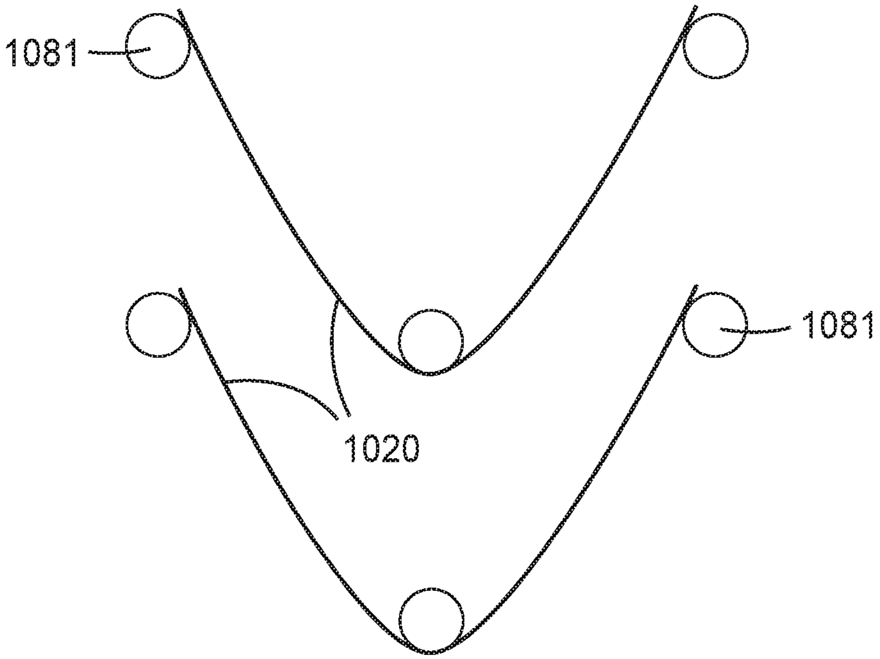
FIG. 13 is a schematic top view of a portion of an enclosure including features holding acoustic baffles.

In some embodiments, the enclosure includes a plurality of features configured to hold the plurality of acoustic baffles in desired shapes (e.g., a chevron shape). For example, in some embodiments, the acoustic baffles are initially planar and are then bent to fit into shapes defined by features in the enclosure. FIG. 13 is a schematic top view of a portion of an enclosure that includes features 1081 formed on a major (e.g., bottom) surface (e.g., rods or cylinders formed on the bottom surface) of the enclosure where acoustic baffles are held in place by the features 1081 (e.g., due to stresses in the acoustic baffles). Other types of features may be used (e.g., features extending from the bottom surface having non-cylindrical shapes, or grooves formed in the bottom surface).

EXAMPLES

TABLE 1

| Materials | |
|---|---|
| Abbreviation or Trade Designation | Description |
| PPS-200 | 100% polypropylene non-woven, nominal basis weight 200 g/m$^2$, with polypropylene scrim available from 3M Japan. It has a UL94 HF-1 flame rating. |
| BC765 | Flame resistant acoustic facing available from, Precision Fabrics Group, Inc., Greensboro, NC. Air flow resistance approximately 700 MKS Rayls. |
| PET film | 2.93 mil clear polyethylene terephthalate (PET) film |
| PET pellets | 0.53 intrinsic viscosity (IV) polyethylene terephthalate (PET) available under the trade designation “N211” from Nan Ya Plastics Corporation USA, Wharton, TX. USA. |
| OL3001 | Phosphorous-based transparent high melt flow flame resistant polymer with phenolic end groups available under the trade designation “NOFIA OL3001” |
| | FRX, available from FRX Polymers, Inc of Chelmsford, MA. USA |
| FR-Rayon SF | Non-meltable Rayon fibers, round cross-section, 4.7 denier, 60 inch cut length, available from Kilop USA, High Point, NC, USA. |
| CONFOR 40-EG | Vibration damping foam available from Aearo Technologies LLC, Indianapolis, IN, USA. It has a UU94 - HBF flame rating. |

Test Methods

Nonwoven Web Thickness Measurement: The method of ASTM D5736-95 was followed, according to test method for thickness of high loft nonwoven fabrics. The plate pressure was calibrated at 0.002 psi (13.790 Pascal). Thickness was measured prior to edge sealing or shaping the web.

Airflow Resistance: A Sigma Static Airflow Resistance Meter (Mecanum Inc, Sherbrooke, Quebec, Canada) was used to measure airflow resistance and airflow resistivity following the method of ASTM C522-03.

Acoustic Absorption Coefficient: The method of ASTM E1050-12 was followed using a 29 mm diameter impedance tube. The cavity depth was 10 mm for all samples tested except for Preparatory Example P1 where a cavity of depth of 25 mm was used. The acoustic absorption coefficient for BC765 was estimated as the difference in acoustic absorption coefficients determined for the nonwoven layer of PPS-200 (without the scrim) with and without BC765 placed at the back of the cavity.

Acoustic Reflection Coefficient: For layers having a low acoustic absorption, the squared magnitude of the acoustic reflection coefficient $|r|^2$ was estimated as $1-|t|^2$ where $|t|^2$ was determined from the transmission loss. The transmission loss was measured using a 44.5 mm diameter impedance tube, supplied by Mecanum Inc. (Sherbrooke, Quebec, Canada) with the accompanying Tube-X version 2.8 software. The transmission loss was determined as generally described in ASTM E2611-17 except that a three microphone, two-load method was used.

Figure 14:
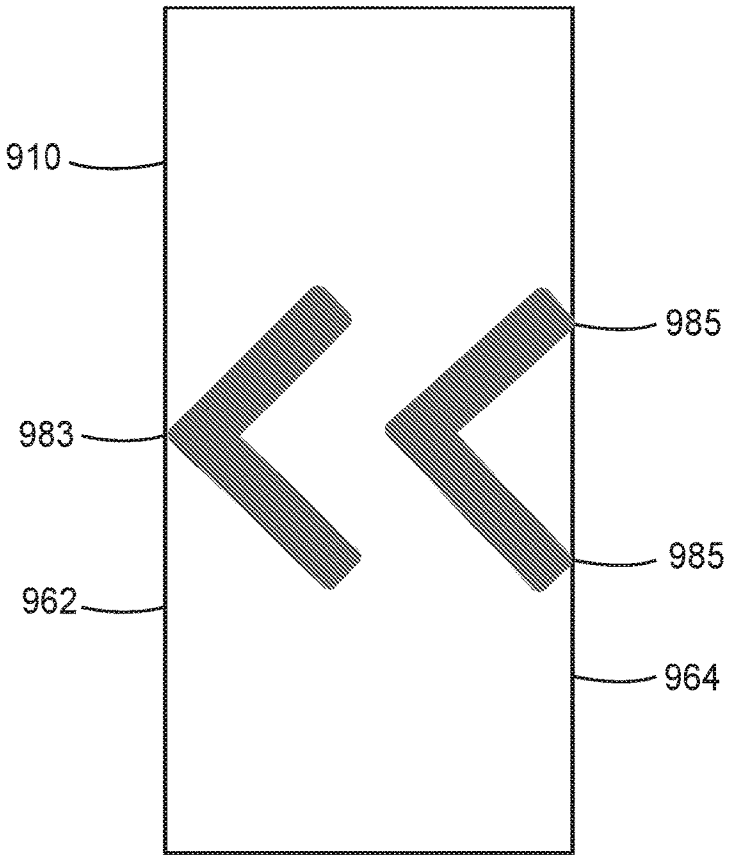
FIG. 14 is a schematic top cross-sectional view of acoustic baffles disposed in a duct.

Insertion Loss: The effect of the nonwoven pillows on sound propagating in a metal duct was measured using a square impedance tube (interior cross section 64 mm×64 mm) with an open outlet. A calibrated multi-field ¼ inch microphones, type 4961 (Brüel & Kjaer, Denmark) was placed approximately 20 cm from the outlet of the impedance tube. Microphone data was collected and analyzed using a Brüel & Kjaer Type 3160-A-042 data acquisition system and the associated Brüel & Kjaer Pulse LabShop software. Pink noise (also known as 1/f noise) was emitted from a speaker in the range of 10 Hz-20 kHz and the sound pressure level vs. frequency measured at the end of the duct. The difference in the measured sound pressure level with nothing in the impedance tube vs. with the sample is the insertion loss. To measure the effect of the pillows, two were placed in the square duct as schematically illustrated in FIG. 14 with the apex 983 of one pillow touching the left wall 962 of the square duct 910 and the bottom points 985 of the other touching the right wall 964 of the square duct 910.

UL94-V0 Flame Test: The UL94-V0 standard was followed with flame height 20-mm, bottom edge of the sample 10-mm into the flame and burn twice at 10 seconds each. A flame propagation height under 125-mm (5 inches) on material with unsealed edges, an after burn time of less than 10 seconds for each flame application, and no drips was considered a pass.

Preparatory Example P1

Step 1: PET pellets were blended with OL3001 additives 20% by weight through hopper feeding into a melt extruder. An extrusion pressure of 1.22 MPa (177 psi) was applied by the melt extruder to produce a melt extrusion rate of 9.08 kg/hour (20 pounds/hour). A 50.8 cm (20 inch) wide melt blowing die of conventional film fibrillation configuration was set up and driven by a melt extruder of conventional type operated at a temperature of 320° C. (608° F.). The die possessed orifices each 0.038 cm (0.015 inch) in diameter.

Step 2: In-flight air quench heated to 315° C. (600° F.) was generally directed onto the extruded melt stream as described in commonly owned U.S. Pat. Appl. Pub. No. 2016/0298266 (Zillig et al.). The heated fibers were directed towards a drum collector. Between the heated air ports and the drum collector, FR-Rayon non meltable fibers were dispensed into the melt-blown fibers. Sufficient staple fibers were dispensed to constitute 35% by weight of the final fabric. The surface speed of the drum collector was 1.83 m/min (6 feet/minute), so that the basis weight of the collected fabric was 250 gsm ($g/m^2$)±10%. The melt-blown fabric was removed from the drum collector and wound around a core at a wind-up stand.

Comparative Example C1

PPS200 nonwoven web was cut into rectangles 65 mm×90 mm. 5 mm×88 mm×1 mm metal strips were bent to an angle of approximately 25 degrees from horizontal (total included angle of 130 degrees) and then applied to the long edges each rectangle using Scotch double sided tape. The insertion loss of two chevrons in the square impedance tube was measured. The results are shown in Table 3. The thickness and airflow resistance of the web were measured on separate 100 mm diameter pieces of PPS200 roll. The scrim was carefully removed from one set of samples in order to measure the airflow resistance and resistivity and absorption coefficient of the PPS200 non-woven alone. The results are shown in Table 2. From the difference in the airflow resistance with and without scrim, the specific airflow resistance of the scrim alone was estimated at $1.6\times10^2$ (Pa·s/m).

Comparative Example C2

The material made in Preparatory Example P1 was cut into rectangles 65 mm×90 mm. The assembly was removed and pressure applied for approximately 5 s to complete bonding of a BC765 scrim to the non-woven web. The edges were sealed using a Branson 200d welder (Branson Ultrasonic Corporation, Danbury, Conn.) with a 6" wide horn and 0.5" thick weld face. Welding conditions were as follows: booster=1.5, Trigger=100 lb, hold 1 s, pressure 25 psi, amplitude 75%, and delivered energy 80 J for the 65 mm sides and 100 J for the 90 mm sides. 5 mm×88 mm×1 mm metal strips were bent to an angle of approximately 25 degrees from horizontal (total included angle of 130 degrees) and then applied to the long edges each rectangle using Scotch double sided tape. The insertion loss of two chevrons in the square impedance tube were measured. The results are shown in Table 3.

Comparative Example C3

A piece of CONFOR 40-EG foam was cut into rectangles 65 mm×90 mm. 5 mm×88 mm×1 mm metal strips were bent to an angle of approximately 25 degrees from horizontal (total included angle of 130 degrees) and then applied to the long edges each rectangle using Scotch double sided tape. Additional tape was added at the edges to help the foam stay bonded to the metal clips when bent. The insertion loss of two chevrons in the square impedance tube were measured.

Examples 1 and 2

PPS200 nonwoven pillows cut into rectangles 65 mm×90 mm. A similarly sized piece of BC765 scrim (1) or PET film (2) was applied to the scrim side of the PPS200 using 3M SUPER 77 Multipurpose Adhesive. 5 mm×88 mm×1 mm metal strips were bent to an angle of approximately 25 degrees from horizontal (total included angle of 130 degree) and then applied to the long edges each rectangle on the PPS200 side using Scotch double sided tape (the film or scrim was thus on the concave side of the chevron). A small amount of tape was added to the short side of each piece in order to pinch the scrim/non-web construction together so that it maintained the desired shape. The insertion loss of two chevrons in the impedance tube was measured and is shown in Table 3. The insertion loss for Examples 1 and 2 were greater than that of Comparative Cl from 1 kHz to 20 kHz. The absorption coefficient of the BC765 was estimated by measuring the normal absorption coefficient of PPS-200 (scrim removed), with and without a piece of BC765 at the back of the cavity.

Example 3

PPS200 nonwoven was cut into rectangles 65 mm×90 mm. The edges were sealed using a Branson 200d welder (Branson Ultrasonic Corporation, Danbury, Conn.) with a 6" wide horn and 0.5" thick weld face. Welding conditions were as follows: booster=1.5, Trigger=100 lb, hold 1 s, pressure 25 psi, amplitude 100%, and delivered energy (100 J for the 65 mm sides and 125 J for the 90 mm sides). A 65×90 mm piece of BC765 scrim was applied to the scrim side of the PPS200 using 3M SUPER 77 Multipurpose Adhesive. A center crimp in the pillow was then generated using the Branson welder (100 J) so that the pillow would hold a chevron shape with an included angle of approximately 130 degrees. The insertion loss of two chevrons in the impedance tube was measured and is shown in Table 3. The insertion loss of the Example 3 was greater than that of Comparative Example C1 from 1 kHz to 20 kHz.

Example 4

The material made in Preparatory Example P1 was cut into rectangles 65 mm×90 mm. BC765 scrim was heated with the non-woven web on top for approximately 10 s on a 230° F. hot plate. The assembly was removed and pressure applied for approximately 5 s to complete bonding of the scrim to the non-woven web. The edges were sealed using a Branson 200d welder (Branson Ultrasonic Corporation, Danbury, Conn.) with a 6" wide horn and 0.5" thick weld face. Welding conditions were as follows: booster=1.5, Trigger=100 lb, hold 1 s, pressure 25 psi, amplitude 100%, and delivered energy (100 J for the 65 mm sides and 125 J for the 90 mm sides).

5 mm×88 mm×1 mm metal strips were bent to an angle of approximately 25 degrees from horizontal (total included angle of 130 degrees) and then applied to the long edges each rectangle on the PPS200 side using Scotch double sided tape (the film or scrim is thus on the concave side of the chevron). The insertion loss of the Example 4 was greater than that of Comparative Example C2 from 1 kHz to 20 kHz.

Using a hot iron, BC765 scrim was applied to separate samples of the same material made in Preparatory Example P1. Five samples of the construction passed the UL94 V0 Flame test.

Example 5

A piece of CONFOR 40-EG foam was cut into rectangles 65 mm×90 mm. BC765 scrim was heated with the foam piece on top for approximately 10 s on a 230° F. hot plate. The assembly was removed and pressure applied for approximately 5 s to complete bonding of the scrim to the foam. 5 mm×88 mm×1 mm metal strips were bent to an angle of approximately 25 degrees from horizontal (total included angle of 130 degrees) and then applied to the long edges each rectangle using Scotch double sided tape. Additional tape was added at the edges to help the foam stay bonded to the metal clips. The insertion loss of two chevrons in the square impedance tube were measured. The results are shown in Table 3. The insertion loss of Example 5 was greater than that of Comparative Example C3 from 1.6 kHz to 20 kHz.

TABLE 2

Thickness and Airflow resistance

| Material/ example | Thickness (±10%) (mm) | Specific Airflow Resistance @ 0.5 mm/s (Pa · s/m) | Airflow Resistivity @ 0.5 mm/s (Pa · s/m$^2$) | α (average 1-6 kHz) |
|---|---|---|---|---|
| PPS200 | 10.5 | $5.9 \times 10^2$ | $5.7 \times 10^4$ | 0.702 |
| PPS200 (scrim removed) | 9.7 | $4.2 \times 10^2$ | $4.6 \times 10^4$ | 0.638 |
| BC765 | 0.5 | $9.3 \times 10^2$ | $1.9 \times 10^6$ | 0.04 |
| Preparatory Example P1 | 18. | $1.8 \times 10^2$ | $1.0 \times 10^4$ | 0.696 |
| CONFOR 40-EG | 10.4 | $7 \times 10^3$ | $7 \times 10^5$ | 0.561 |

TABLE 3

Insertion Loss (dB)

| ⅓ Octave Band | Center Frequency (Hz) | Comparatives C1 | C2 | C3 | Examples 1 | 2 | 3 | 4 | 5 |
|---|---|---|---|---|---|---|---|---|---|
| 1 | 20 | −0.1 | 0.62 | 1.8 | 0.5 | −0.7 | −0.7 | 0.3 | 0.0 |
| 2 | 25 | 0.0 | −0.8 | 0.8 | −0.1 | 0.5 | 1.0 | −1.3 | 0.1 |
| 3 | 31.5 | 0.0 | 0.8 | 0.8 | −0.9 | −0.1 | 0.4 | 0.4 | −0.2 |
| 4 | 40 | 0.8 | 1.0 | 1.7 | 1.5 | 0.5 | 1.0 | 1.2 | 0.5 |
| 5 | 50 | 1.4 | 2.1 | 2.0 | 2.4 | 1.6 | 1.3 | 1.6 | 0.8 |
| 6 | 63 | 0.4 | 1.5 | 0.9 | 0.2 | 0.9 | 1.1 | 1.0 | 0.4 |
| 7 | 80 | −0.4 | 0.8 | −0.1 | 0.5 | 0.4 | 0.6 | 0.7 | 0.2 |
| 8 | 100 | 0.0 | 0.6 | 0.4 | 0.3 | 0.4 | 0.6 | 0.7 | 0.4 |
| 9 | 125 | −0.3 | 0.6 | 1.5 | 0.6 | 0.0 | 0.0 | 1.2 | 0.7 |
| 10 | 160 | 0.7 | 0.4 | 3.6 | 3.0 | 0.7 | 0.6 | 2.0 | 3.0 |
| 11 | 200 | 0.0 | 0.0 | −0.5 | 0.0 | −0.2 | 0.3 | 0.0 | −0.4 |
| 12 | 250 | 1.0 | 1.9 | 0.8 | 2.7 | 0.5 | 3.4 | 1.8 | −0.1 |

TABLE 3-continued

| | | Insertion Loss (dB) | | | | | | | |
|---|---|---|---|---|---|---|---|---|---|
| ⅓ Octave | Center Frequency | Comparatives | | | Examples | | | | |
| Band | (Hz) | C1 | C2 | C3 | 1 | 2 | 3 | 4 | 5 |
| 13 | 315 | 3.9 | 5.0 | 3.2 | 7.0 | 4.0 | 1.5 | 5.1 | 3.1 |
| 14 | 400 | 6.7 | 6.5 | 7.6 | 9.2 | 7.2 | 4.0 | 6.7 | 6.8 |
| 15 | 500 | 1.7 | 2.2 | 1.8 | 2.6 | 1.4 | 1.2 | 2.0 | 1.7 |
| 16 | 630 | 2.5 | 1.9 | 1.0 | 3.1 | 2.4 | 1.3 | 2.0 | 0.7 |
| 17 | 800 | 0.4 | 1.1 | 1.5 | 0.8 | 0.6 | 0.9 | 1.1 | −0.5 |
| 18 | 1000 | 2.7 | 3.2 | 2.7 | 4.7 | 3.1 | 3.7 | 3.7 | 3.1 |
| 19 | 1250 | 2.8 | 2.8 | 4.9 | 4.3 | 3.3 | 3.2 | 2.7 | 4.5 |
| 20 | 1600 | 3.2 | 3.5 | 3.3 | 4.8 | 3.8 | 3.7 | 3.7 | 4.7 |
| 21 | 2000 | 3.5 | 3.3 | 4.1 | 4.8 | 3.9 | 4.2 | 3.6 | 5.7 |
| 22 | 2500 | 3.3 | 3.2 | 4.5 | 4.6 | 4.4 | 4.1 | 3.5 | 5.2 |
| 23 | 3150 | 4.1 | 4.0 | 3.9 | 6.0 | 5.0 | 5.1 | 4.3 | 6.0 |
| 24 | 4000 | 5.0 | 4.6 | 4.4 | 7.7 | 5.9 | 6.3 | 5.0 | 7.5 |
| 25 | 5000 | 5.8 | 5.3 | 5.4 | 9.2 | 7.5 | 7.4 | 5.8 | 8.6 |
| 26 | 6300 | 8.2 | 6.6 | 7.7 | 12.8 | 11.8 | 10.2 | 7.3 | 10.3 |
| 27 | 8000 | 9.5 | 7.3 | 10.0 | 14.4 | 12.6 | 11.5 | 8.2 | 11.7 |
| 28 | 10000 | 11.8 | 9.3 | 13.1 | 17.2 | 13.3 | 14.4 | 10.6 | 14.7 |
| 29 | 12500 | 13.2 | 10.3 | 13.4 | 20.9 | 15.0 | 15.9 | 12.4 | 17.9 |
| 30 | 16000 | 17.5 | 13.0 | 15.9 | 22.1 | 18.9 | 21.1 | 15.3 | 17.3 |
| 31 | 20000 | 14.5 | 14.4 | 17.8 | 20.6 | 17.6 | 16.6 | 15.9 | 22.1 |

Figure 23:
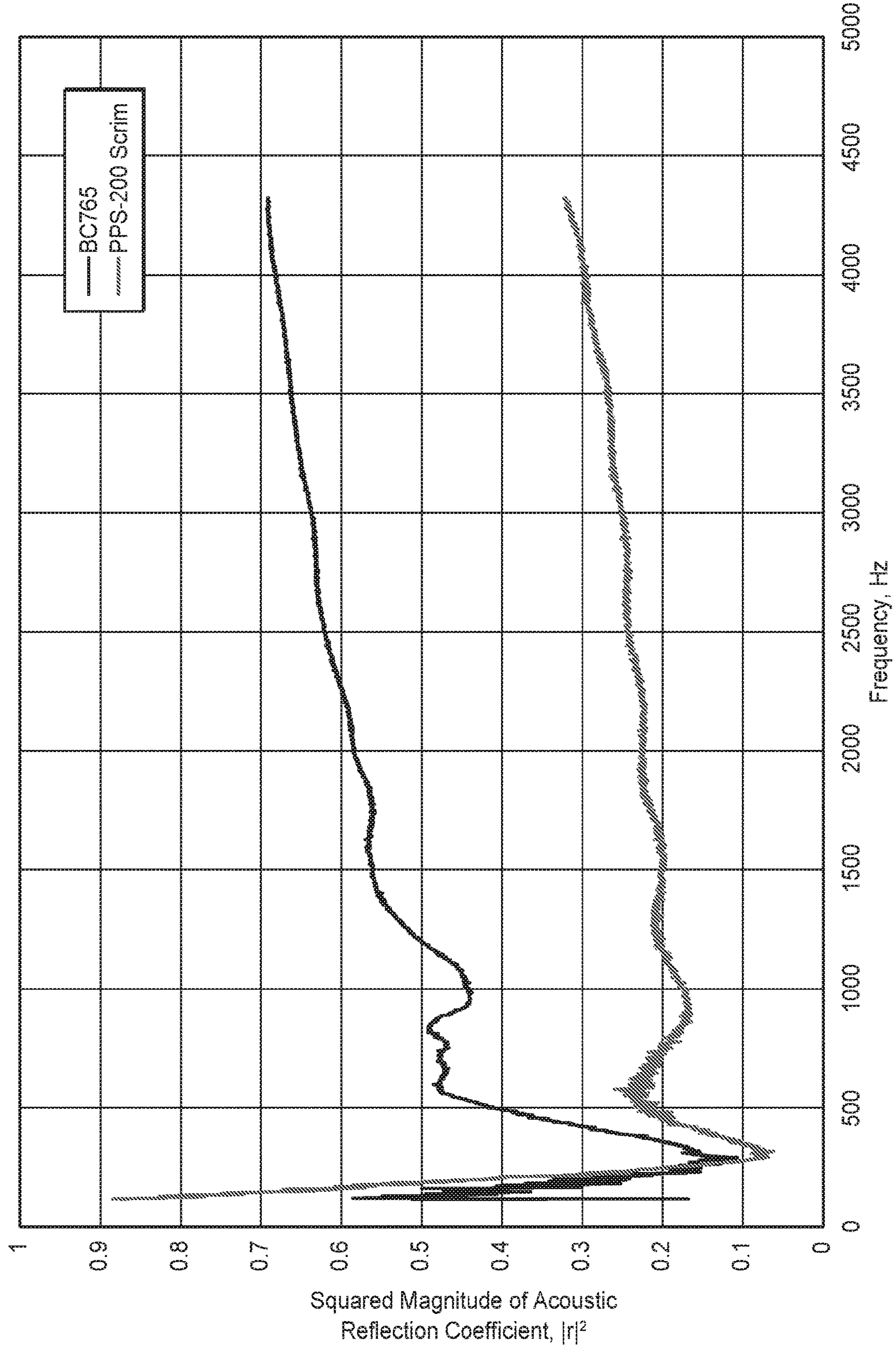
FIG. 23 is a plot of the squared magnitude of acoustic reflection coefficients as a function of frequency.

The squared magnitude of the acoustic reflection coefficient, $|r|^2$, for the scrim used in PPS-200 and for the BC765 scrim were estimated from measured transmission loss as described under "Acoustic Reflection Coefficient". The estimated $|r|^2$ for the PPS-200 and BC765 scrims are plotted in FIG. 23. The average $|r|^2$ over a frequency range of 1 kHz to 6 kHz was estimated to be 0.27 for PPS-200 and 0.63 for BC765 based on linear extrapolation of the data to 6 kHz. These estimates are expected to slightly overestimate $|r|^2$ due to the neglect of absorption.

Example 6

Figure 15:
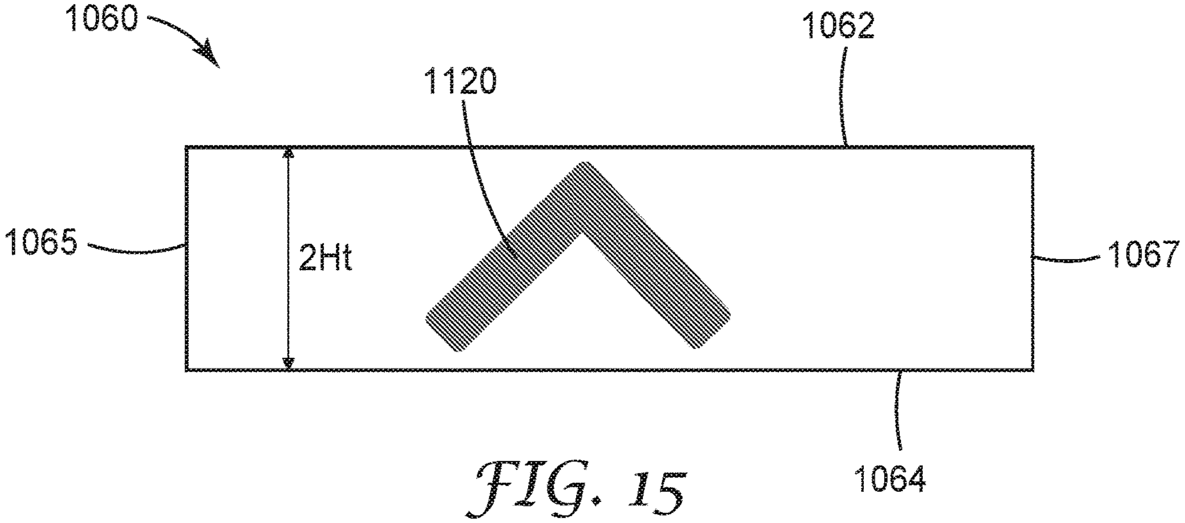
FIG. 15 is a schematic illustration of a simulation cell used in acoustic modeling.

Acoustic modeling was carried out using COMSOL MULTIPHYSICS modeling software, a commercially available finite element (FE) code. The two-dimensional FE models used a unit cell including an acoustic baffle surrounded by air regions. The Johnson-Champoux-Allard model was used to describe the fibrous portions of each acoustic baffle. A unit cell 1060 is schematically depicted in FIG. 15. Cooling air flow channels were adjacent to the acoustic baffle 1120 on either side, and the unit cell's top and bottom edges 1062 and 1064 were located on the channel centerlines. A planar sound wave with unit pressure amplitude was introduced in the model on the left-hand edge 1065. Radiation or non-reflecting boundary conditions were applied to the left and right-hand edges 1065 and 1067 of the model. The distance between channel centerlines was 2 Ht which was taken to be 50 mm except where indicated otherwise. Periodic boundary conditions were applied on these top and bottom edges since the neighboring cells were taken to have identical geometry. By analyzing one cell with such boundary conditions, the performance of a larger array that might be typically be used (e.g., 10 acoustic baffles) can be approximately determined. A typical sound pressure level field was then calculated over a frequency span of 100 Hz to 20,000 Hz. To gauge the performance of the acoustic baffles, the transmission loss (TL) through the unit cell was calculated as 10 times the base 10 logarithm of the ratio of the power level in the left hand side to the power level in the right hand side.

Figure 16:
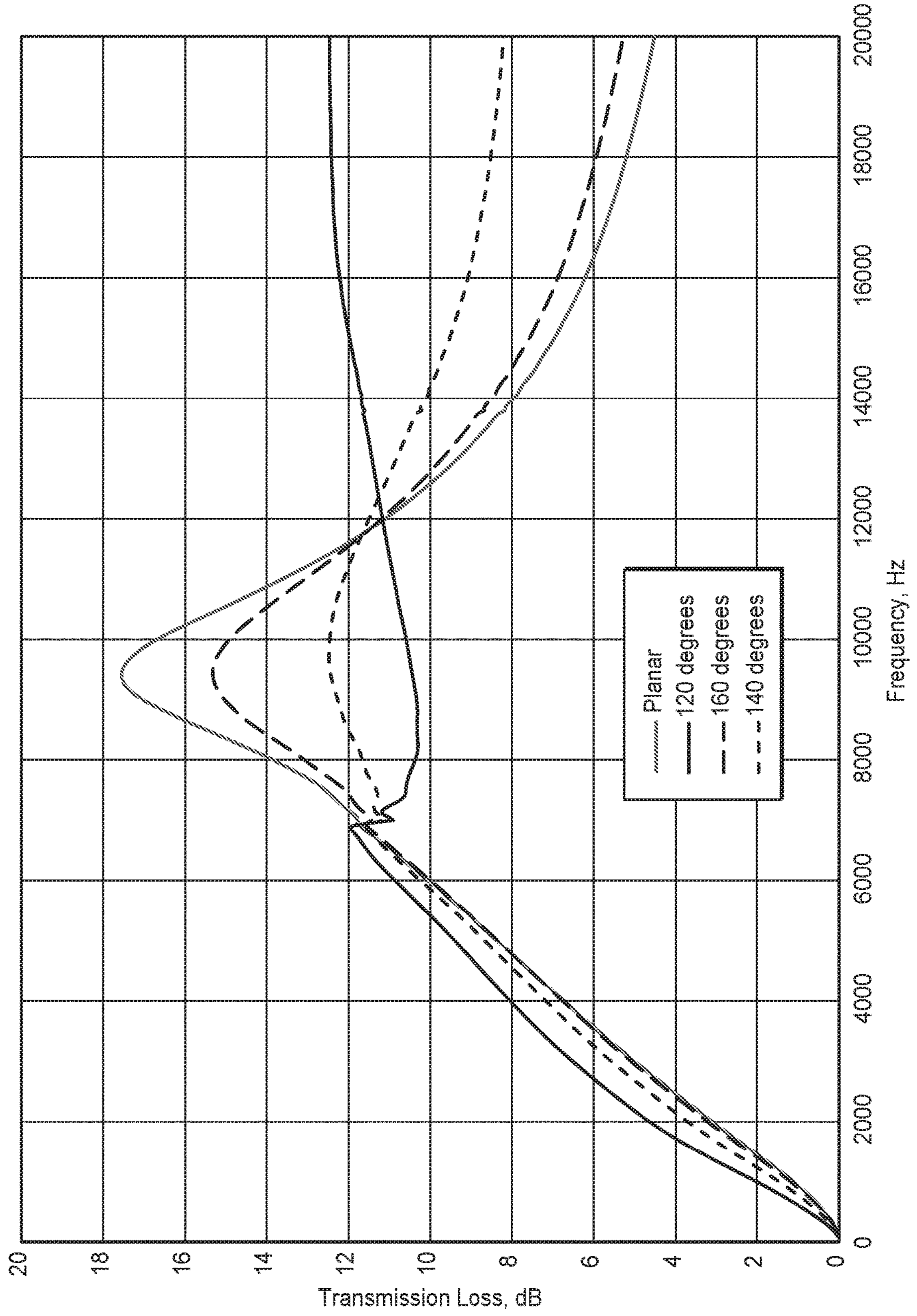
FIGS. 16-22 are plots of transmission loss versus frequency for various assemblies determined by acoustic modeling.

FIG. 16 is a plot of the transmission loss for chevron-shaped acoustic baffles for various chevron angles (the included angle θ depicted in FIG. 4) and for a planar acoustic baffle. The height 2 Ht of the unit cell was 50 mm and the downstream length L (see, e.g., FIG. 4) was 11 cm. The material used in the acoustic baffles was taken to have an airflow resistivity of 30800 MKS Rayl/m and a thickness of 13 mm.

Figure 17:
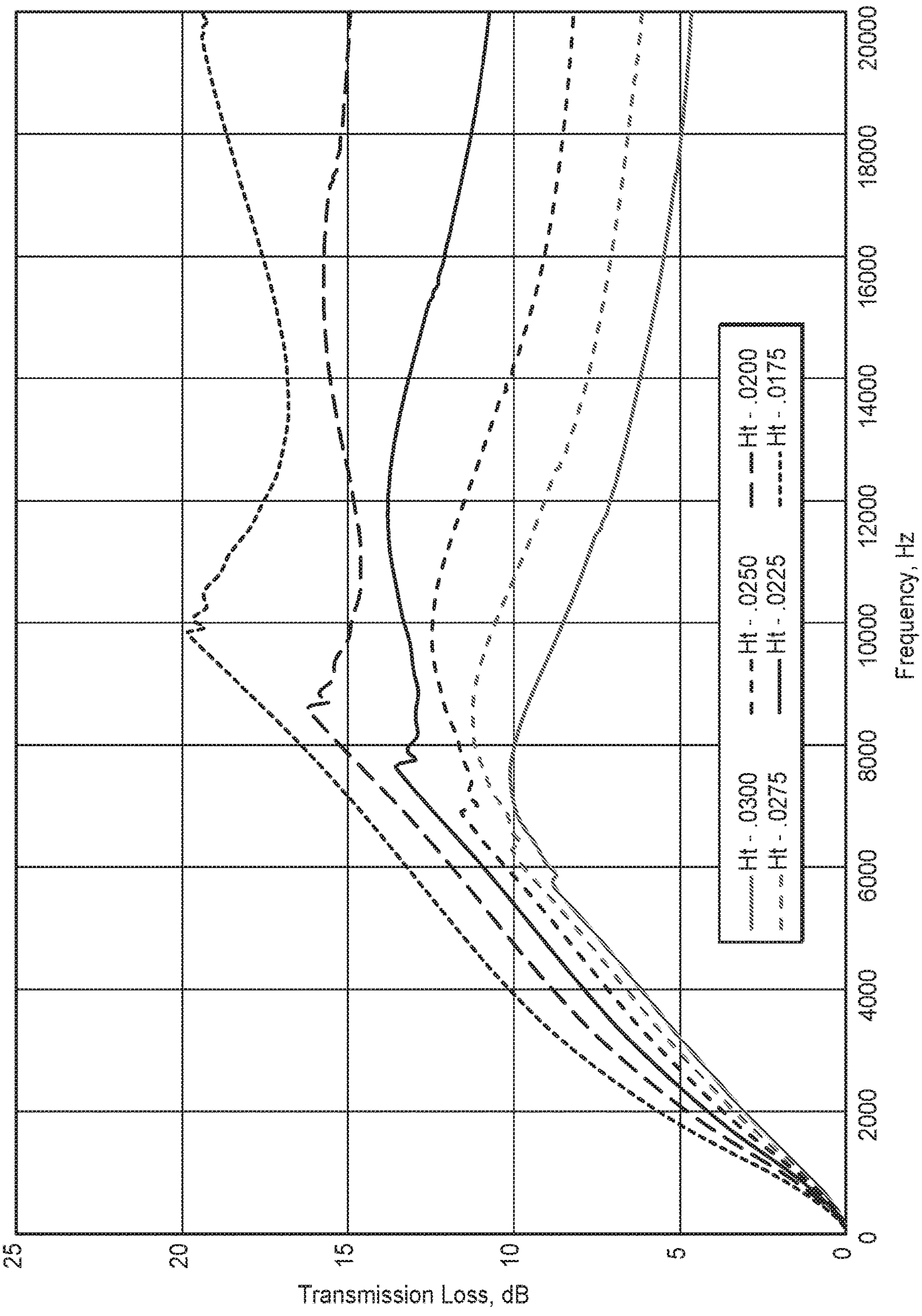

FIG. 17 is a plot of the transmission loss for different spacings between chevron-shaped acoustic baffles where the chevron angle was held fixed at 140 degrees. The height 2 Ht of the unit cell was varied (the height Ht in m is indicated on the plot) and the downstream length L (see, e.g., FIG. 4) was 11 cm. The material used in the acoustic baffles was taken to have an airflow resistivity of 40000 MKS Rayl/m and a thickness of 13 mm.

Figure 18:
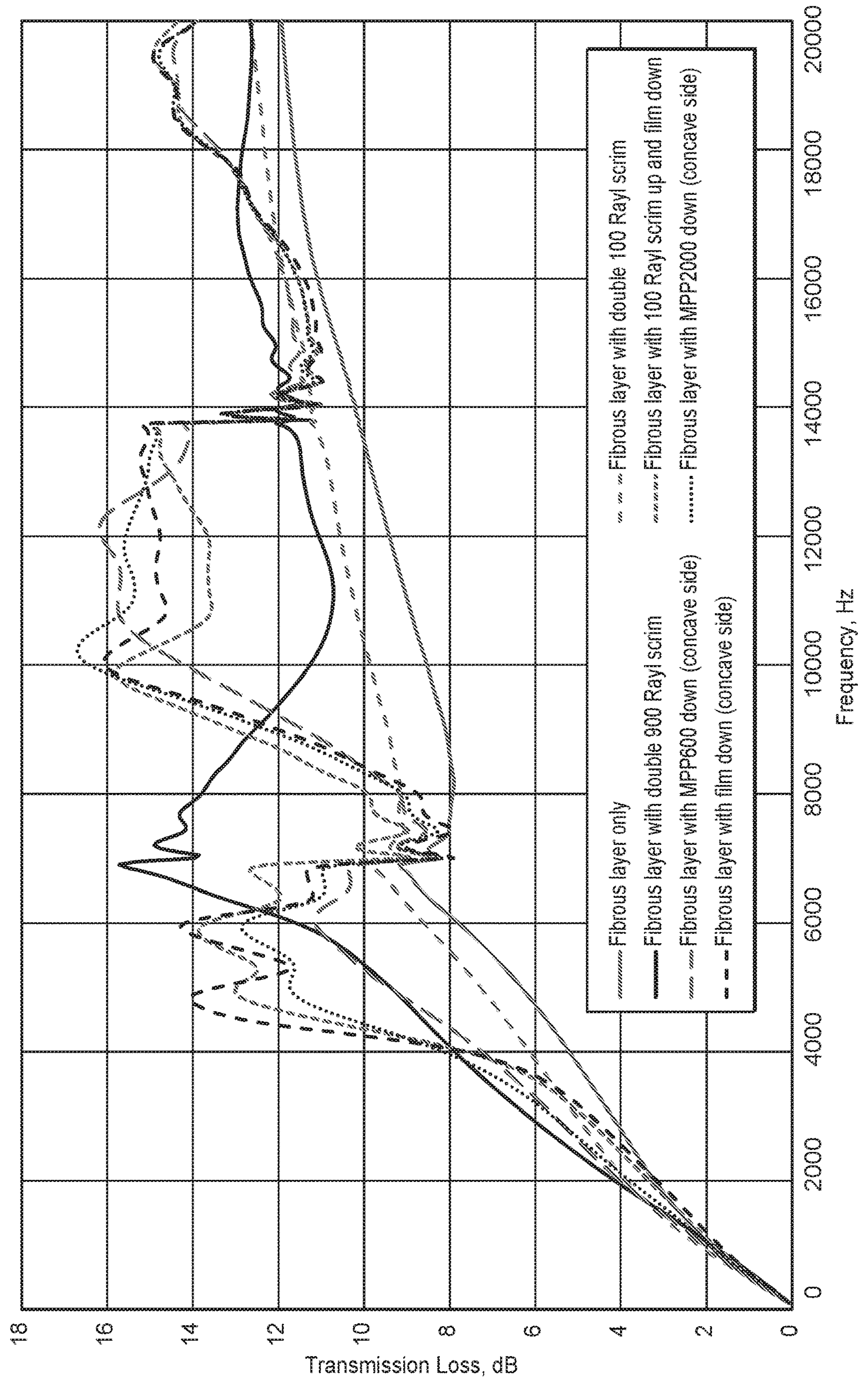

FIG. 18 is a plot of the transmission loss for chevron-shaped acoustic baffles where the chevron angle was held fixed at 120 degrees and the length L was 11 cm. The material used in the acoustic baffles was taken to be an acoustically absorptive layer (denoted fibrous layer in the plot) with an airflow resistivity of 14200 MKS Rayl/m and a thickness of 13 mm, and additional layer(s) on one or both sides of the acoustically absorptive layer. In some of the simulations, a scrim (100 MKS Rayl or 900 MKS Rayl) was included on one or both sides of the fibrous layer. In some of the simulations, a film was included on the concave side (the down side facing bottom edge 1064 in FIG. 15) where the film had a 100 gsm basis weight. In some of the simulations, a microperforated film with a specific airflow resistance of 600 MKS Rayl (MPP600) or 2000 MKS Rayl (MPP2000) was included on the concave side (down side). The results show that using a film, a scrim with a specific airflow resistance of 900 MKS Rayl, or a microperforated film with a specific airflow resistance of 600 MKS Rayl or 2000 MKS Rayl as an additional layer substantially increased the transmission loss in one or more frequency ranges compared to using no additional layers or compared to using a scrim with a specific airflow resistance of 100 MKS Rayl.

Example 7

Acoustic modeling was carried out using COMSOL MULTIPHYSICS modeling software using a unit cell as generally described for Example 6. The acoustic baffle was modeled as a planar baffle disposed in the center of the cell where the baffle included microperforated films on opposite sides a spacer layer. Each microperforated film was modeled as a transfer impedance surface that separated the flow channel from airspace within cells of the spacer layer. The spacer layer was modeled as having one or more cells. The sound pressure field showed a jump or discontinuity across the microperforated films and between adjacent cells. Using a plurality of cells was found to provide improved low frequency absorption.

Figure 19:
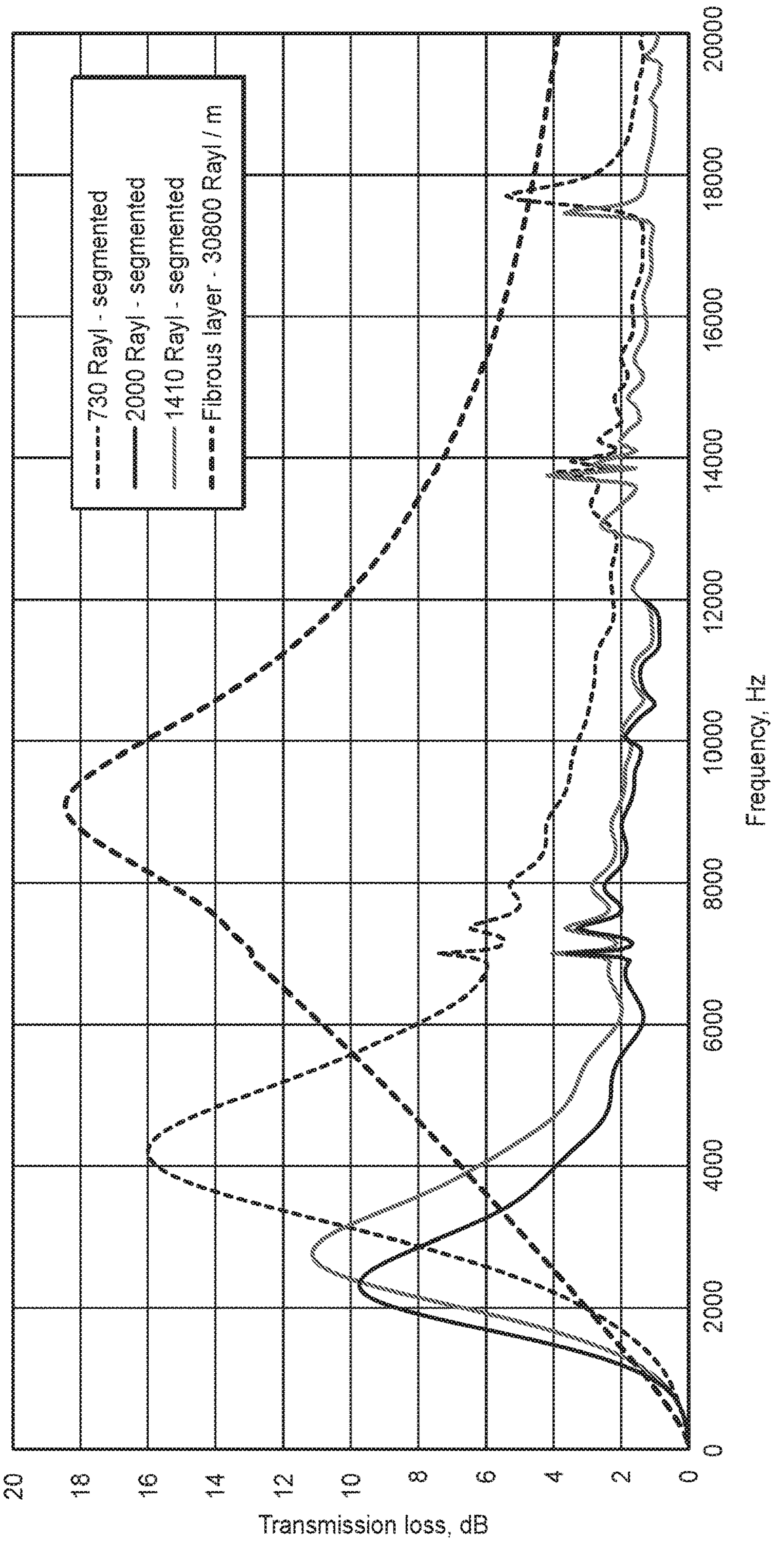

FIG. 19 is a plot of the transmission loss for a microperforated panel including microperforated films having various specific airflow resistances and including a spacer layer with 11 cells arranged in the downstream direction. For comparison, the results for a fibrous layer having an airflow resistivity of 30800 MKS Rayl/m is illustrated.

Figure 20:
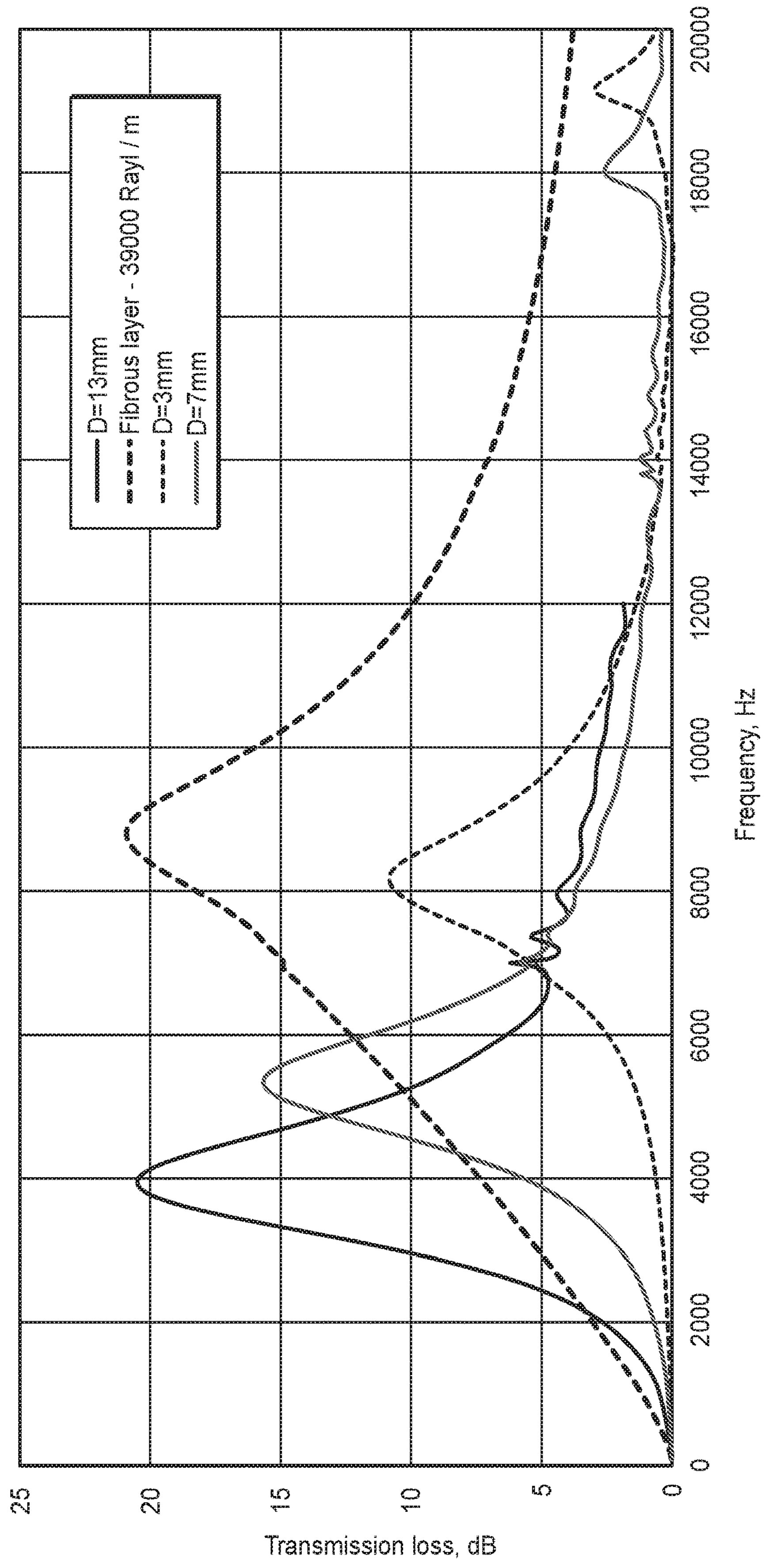

FIG. 20 is a plot of the transmission loss for a microperforated panel including microperforated films each having a specific airflow resistance of 600 MKS Rayl and including a spacer layer with 11 cells arranged in the downstream direction for various cell depths D (see, e.g., FIG. 7A). For comparison, the results for a fibrous layer having an airflow resistivity of 39000 MKS Rayl/m is illustrated.

Figure 21:
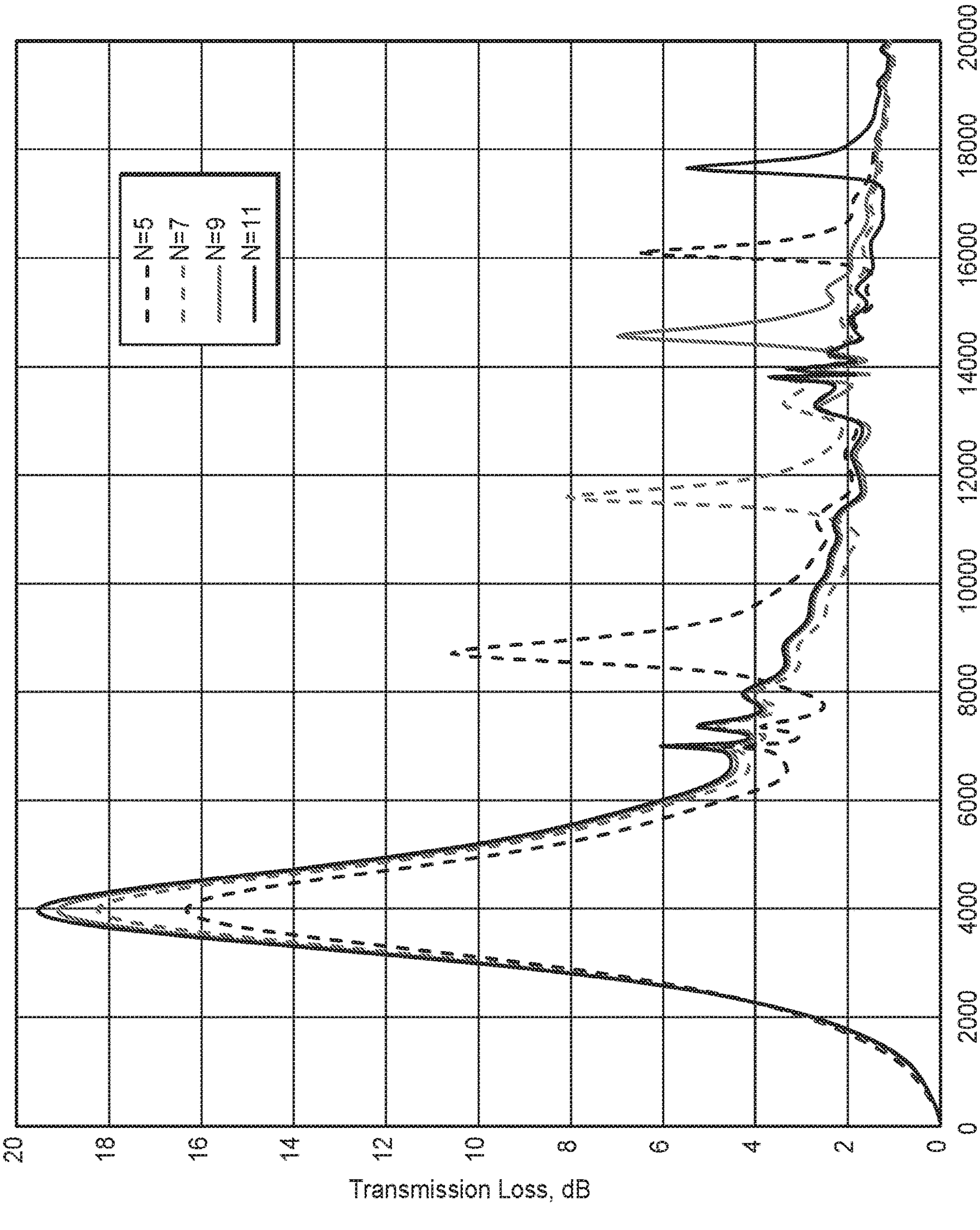

FIG. 21 is a plot of the transmission loss for a microperforated panel including a spacer layer with a various number (N) of cells arranged in the downstream direction. Each of the microperforated films had a specific airflow resistance of 600 MKS Rayl and the spacer layer with had a cell depth D of 13 mm.

Figure 22:
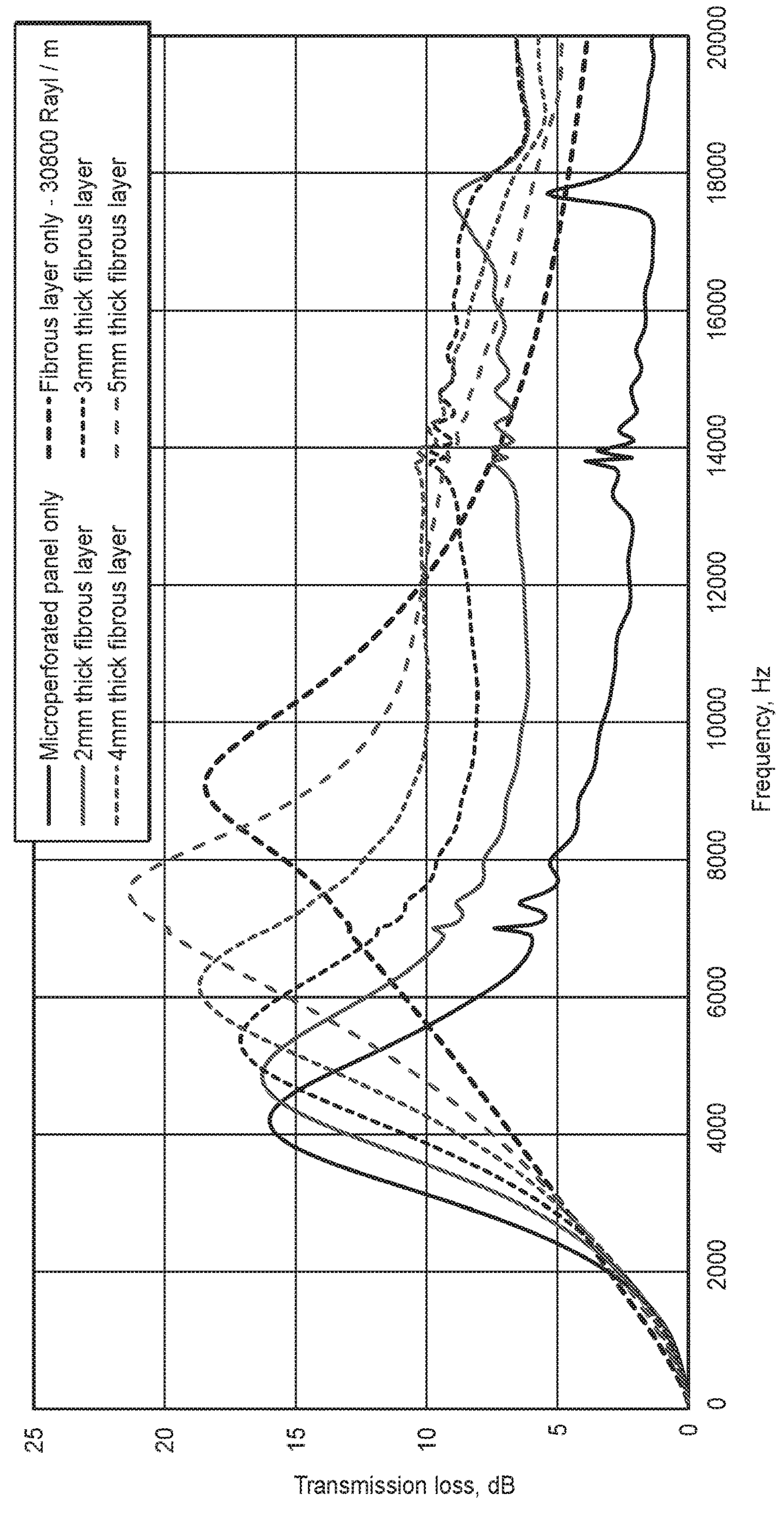

FIG. 22 is a plot of the transmission loss for a microperforated panel including microperforated films each having a specific airflow resistance of 730 MKS Rayl, including a spacer layer with 11 cells arranged in the downstream direction, and including acoustically absorptive layers on each side of the microperforated panel. The thickness of the spacer layer and the acoustically absorptive layers were varied while keeping the total thickness at 13 mm. The sample labeled 2 mm thick fibrous layer, for example, had 2 mm thick fibrous layers on each side of a 9 mm microperforated panel. The acoustically absorptive layers (fibrous layers) had an airflow resistivity of 39000 MKS Rayl. For comparison, the results for a single 13 mm thick nonwoven layer having an airflow resistivity of 30800 MKS Rayl/m is shown. For the acoustic baffle that included 5 mm thick acoustically absorptive layers disposed on each side on a 3 mm segmented spacer layer, the band for an 8 dB or greater transmission loss was in a range of 4200 Hz to 15050 Hz (bandwidth of 10850 Hz). For the single nonwoven layer, the band for an 8 dB or greater transmission loss was in a range of 4650 Hz to 13400 Hz (bandwidth of 8750 Hz).

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof

What is claimed is:

1. An assembly comprising:

an enclosure comprising first and second regions spaced apart along a first direction; and a plurality of spaced apart acoustic baffles arranged along a second direction different from the first direction and disposed in the enclosure between the first and second regions, the plurality of spaced apart acoustic baffles comprising adjacent first and second acoustic baffles, each of the first and second acoustic baffles comprising a first acoustically absorptive layer disposed on a first sheet having a specific airflow resistance greater than 200 MKS Rayl, the first and second acoustic baffles defining a channel therebetween, at least a portion of the channel extending along a longitudinal direction making an oblique angle with the first direction, wherein for a frequency range extending at least from 1 kHz to 6 kHz, the first acoustically absorptive layer has an average acoustic absorption coefficient of greater than 0.2 as determined according to ASTM E1050-12, and the first sheet has an average acoustic reflectance of greater than 0.3 as determined from an acoustic transfer matrix determined according to ASTM E2611-17 and an average acoustic absorption coefficient of less than 0.05 as determined according to ASTM E1050-12.

2. The assembly of claim 1, wherein each of the first and second acoustic baffles further comprises a second acoustically absorptive layer disposed on the first sheet opposite the first acoustically absorptive layer.

3. The assembly of claim 1, wherein the first sheet comprises a microperforated panel.

4. The assembly of claim 1, wherein the first acoustically absorptive layer comprises a nonwoven layer or a foam layer.

5. The assembly of claim 1, wherein the first acoustically absorptive layer comprises a nonwoven layer, the nonwoven layer comprising a plurality of melt- blown fibers comprising a thermoplastic polymer blended with at least one of a phosphinate or a polymeric phosphonate.

6. An assembly comprising:

an enclosure comprising first and second regions spaced apart along a first direction; and a plurality of spaced apart acoustic baffles arranged along a second direction different from the first direction and disposed in the enclosure between the first and second regions, the plurality of spaced apart acoustic baffles comprising adjacent first and second acoustic baffles, each of the first and second acoustic baffles comprising an acoustically absorptive layer disposed on an acoustically reflective layer, the acoustically reflective layer of the first acoustic baffle facing the acoustically absorptive layer of the second acoustic baffle such that at least a portion of sound propagating from the first region toward the second region reflects from the acoustically reflective layer of the first acoustic baffle and is absorbed by the acoustically absorptive layer of the second acoustic baffle, wherein for a frequency range extending at least from 1 kHz to 6 kHz, the acoustically absorptive layer has an average acoustic absorption coefficient $\alpha 1$ as determined according to ASTM E1050-12, and the acoustically reflective layer has an average acoustic absorption coefficient α2 as determined according to ASTM E1050-12 and an average acoustic reflectance of greater than 0.3 as determined from an acoustic transfer matrix determined according to ASTM E2611-17, $\alpha 1>0.2$, $\alpha 2<0.05$.

7. The assembly of claim 6, wherein each of the first and second acoustic baffles has a chevron shape.

8. The assembly of claim 6, wherein at least one of the first and second acoustic baffles comprises at least one region where first and second portions of the acoustic baffle having different locations along a length of the acoustic baffle are attached to one another by one or more of stitching, melt bonding, or ultrasonic bonding.

9. An assembly comprising:

an enclosure comprising first and second regions spaced apart along a first direction;

a plurality of spaced apart acoustic baffles arranged along a second direction different from the first direction and disposed in the enclosure between the first and second regions, the plurality of spaced apart acoustic baffles comprising at least one acoustic baffle comprising first and second acoustically absorptive layers and a microperforated panel disposed therebetween;

one or more fans disposed in, or proximate to, the first region for providing airflow toward the second region; and one or more hard disk drives disposed in the second region, wherein during operation of the one or more fans:

a pressure drop across the plurality of spaced apart acoustic baffles along the first direction is less than 20 Pa;

a pressure drop between the one or more fans and the one or more hard drives is greater than 200 Pa; and the plurality of spaced apart acoustic baffles increases a transmission loss between the first and second regions by at least 10 dB for at least one frequency in a range of 1 kHz to 6 kHz.

10. The assembly of claim 9, wherein the at least one acoustic baffle comprises adjacent first and second acoustic baffles, the first and second acoustic baffles defining a channel therebetween, at least a portion of the channel extending along a longitudinal direction making an oblique angle with the first direction.

11. The assembly of claim 9, wherein the microperforated panel comprises first and second microperforated layers spaced apart by a spacer layer, the spacer layer comprising a plurality of open cells defined by sidewalls extending along a thickness direction of the spacer layer.

12. The assembly of claim 9, wherein at least one of first and second acoustically absorptive layers comprises a nonwoven layer or a foam layer.

13. The assembly of claim 6, further comprising:

one or more fans disposed in, or proximate to, the first region for providing airflow toward the second region; and one or more hard disk drives disposed in the second region.

14. The assembly of claim 1, further comprising:

one or more fans disposed in, or proximate to, the first region for providing airflow toward the second region; and one or more hard disk drives disposed in the second region.

15. The assembly of claim 1, wherein each of the first and second acoustic baffles has a chevron shape.

16. The assembly of claim 1, wherein at least one of the first and second acoustic baffles comprises at least one region where first and second portions of the acoustic baffle having different locations along a length of the acoustic baffle are attached to one another by one or more of stitching, melt bonding, or ultrasonic bonding.

17. The assembly of claim 13, wherein during operation of the one or more fans:

a pressure drop across the plurality of spaced apart acoustic baffles along the first direction is less than 20 Pa;

a pressure drop between the one or more fans and the one or more hard drives is greater than 200 Pa; and the plurality of spaced apart acoustic baffles increases a transmission loss between the first and second regions by at least 10 dB for at least one frequency in a range of 1 kHz to 6 kHz.

18. The assembly of claim 14, wherein during operation of the one or more fans:

a pressure drop across the plurality of spaced apart acoustic baffles along the first direction is less than 20 Pa;

a pressure drop between the one or more fans and the one or more hard drives is greater than 200 Pa; and the plurality of spaced apart acoustic baffles increases a transmission loss between the first and second regions by at least 10 dB for at least one frequency in a range of 1 kHz to 6 kHz.

* * * * *